(12) United States Patent
Sekine

(10) Patent No.: US 7,835,032 B2
(45) Date of Patent: Nov. 16, 2010

(54) COLOR PROCESSING APPARATUS AND METHOD THEREOF

(75) Inventor: Hisato Sekine, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 780 days.

(21) Appl. No.: 11/746,789

(22) Filed: May 10, 2007

(65) Prior Publication Data

US 2007/0263265 A1 Nov. 15, 2007

(30) Foreign Application Priority Data

May 12, 2006 (JP) .............................. 2006-134449
Apr. 20, 2007 (JP) .............................. 2007-111903

(51) Int. Cl.
 H04N 1/60 (2006.01)
 G03F 3/08 (2006.01)
 H04N 1/46 (2006.01)
 G06K 9/00 (2006.01)

(52) U.S. Cl. .................... 358/1.9; 358/518; 358/521; 358/523; 358/534; 358/536; 358/3.23; 382/162; 382/167

(58) Field of Classification Search ................ 358/1.9, 358/521, 534, 523, 3.23, 536, 518; 382/162, 382/167; 106/31.32, 31.64
See application file for complete search history.

(56) References Cited

U.S. PATENT DOCUMENTS 6,592,212 B1 7/2003 Kakutani 7,285,158 B2 * 10/2007 Iwanami et al. .......... 106/31.32
2004/0070777 A1 4/2004 Nishikawa et al.
2005/0083346 A1 4/2005 Takahashi
2005/0219569 A1 * 10/2005 Yamamoto et al. .......... 358/1.9

FOREIGN PATENT DOCUMENTS

| JP | 05-176166 A | 7/1993 |
| JP | 10-191087 A | 7/1998 |
| JP | 2000-343731 A | 12/2000 |
| JP | 2004-058622 A | 2/2004 |
| JP | 2004-064545 A | 2/2004 |

OTHER PUBLICATIONS

T. Ogashara and N. Ohta, "Verification of the Optimum Prediction Model", The Society for Imaging Science and Technology, http://www.imaging.org, reprinted from vol. 48, 2004.

* cited by examiner

*Primary Examiner*—Charlotte M Baker
(74) *Attorney, Agent, or Firm*—Canon USA Inc IP Division

(57) ABSTRACT

A spectral reflectance, corresponding to multiple quantities of coloring materials, is obtained, and a target spectral reflectance, corresponding to data of a color of interest, calculated based on the spectral reflectance. The target spectral reflectance is calculated in a manner that makes the spectral reflectance change contiguously, across an interval of multiple colors that are reproduced by the quantities of coloring materials in question. A decision of the quantities of coloring materials in question is thus made that corresponds to the target spectral reflectance.

18 Claims, 25 Drawing Sheets

GRADATION OF TARGET SPECTRAL REFLECTANCE PERTAINING TO PRIMARY

GRADATION OF TARGET SPECTRAL REFLECTANCE PERTAINING TO PRIMARY LINE

COLOR PROCESSING APPARATUS AND METHOD THEREOF

BACKGROUND OF THE INVENTION

1. Field of the Invention

The invention relates to a color separation technology as pertains to print processing, and in particular, to a spectral color separation technology for contiguously separating a color of a color image on a spectral basis.

2. Description of the Related Art

There are four of what are referred to as coloring materials, known as Cyan (C), Magenta (M), Yellow (Y), and Black (K), that are employed when printing a color image via a printer or other image forming apparatus. In recent times, additional coloring materials are also employed, such as a Light Cyan (Lc), a Light Magenta (Lm), and Gray (Gy), wherein a concentration of a particular color is reduced. On the other hand, Red (R), Green (G), and Blue (B) are each referred to as a spot color.

In a typical circumstance, a color space of an inputted image differs from a color space of an image that is printed using the aforementioned coloring materials. It is therefore necessary to convert the color space of the image data to a color space of the coloring material, in order that a color appearance of a printed image is made to conform to a color appearance of an inputted image. If, for example, the color space of the inputted image is an RGB space, and the color space of the printed image is a CMYK color space, it will be necessary to convert RGB values to CMYK values, a process that is referred to hereinafter as color separation. In such a circumstance, reproduction of a graininess and a tone characteristic of the inputted image, as well as the color thereof, is desired in the printed image.

A technology known as calorimetric color reproduction is typically employed as a method of reproducing the color of the image. Colorimetric color reproduction is a color reproduction method that uses a human visual sensory property, hereinafter referred to as metamerism, of identifying two substances as being of the same color even if their spectral reflectance characteristics differ, provided that their tristimulus values are equal when exposed to a given light source.

Following is a detailed description of the calorimetric color reproduction method.

FIG. 20 illustrates the calorimetric color reproduction method.

As shown in FIG. 20, a light that is emitted from a light source 2000 is incident upon a substance 2001, and a reflected light therefrom is incident upon a human eye 2002, whereby a shape or a color of the substance 2001 is recognized. The incident light is converted into a color signal by three types of a cell, known as a cone that is found in a retina of the human eye. A human being identifies a color based on an intensity of the color signal, known as the tristimulus values XYZ, which may be depicted using a set of equations (1) that follow, when a spectral distribution of the light emission source is defined as $S(\lambda)$, the spectral reflectance of the substance defined as $o(\lambda)$, and a spectral property of the human eye is an isochromatic function $\bar{x}(\lambda), \bar{y}(\lambda), \bar{z}(\lambda)$ as defined by the International Commission on Illumination (CIE):

$$k = \frac{100}{\int_{380nm}^{780nm} s(\lambda)\bar{y}(\lambda)}$$ (1)

$$X = k \int_{380nm}^{780nm} s(\lambda)o(\lambda)\bar{x}(\lambda)d\lambda$$

$$Y = k \int_{380nm}^{780nm} s(\lambda)o(\lambda)\bar{y}(\lambda)d\lambda$$

$$Z = k \int_{380nm}^{780nm} s(\lambda)o(\lambda)\bar{z}(\lambda)d\lambda$$

Where k is a normalizing coefficient. That is to say, the calorimetric color reproduction method uses the fact that an original color and a reproduced color are identified as being the same color if the XYZ values of the original color and the XYZ values of the reproduced color, as calculated using the equation (1), are congruent.

A variety of image processing methods are proposed as pertains to the reproduction of the graininess or the tone characteristic based on the calorimetric color reproduction method. A technology exists that employs dark and light coloring materials, with respectively differing intensities, to improve the graininess. See, Japanese Patent Laid Open No. 2000-343731, or U.S. Pat. No. 6,592,212.

A technology also exists that contiguously changes an overall quantity used of each respective coloring material for each respective combination of a plurality of types of the coloring material quantity to improve the tone characteristics. See, Japanese Patent Laid Open No. 2004-058622, or U.S. Patent Laid Open No. 2004/070777. T. Ogasahara and N. Ohta, "Verification of the Optimum Prediction Model" discloses employing among other technologies, an established technology known as a Celler Yule-Nielsen Modified Spectral Neugebauer for a predictive model of an estimation of the spectral reflectance of the printed material or other matter.

In the calorimetric color reproduction method, as depicted by the equation (1), however, the XYZ values are dependent upon the light emission source $S(\lambda)$. Consequently, even if the XYZ values of the original color and the XYZ values of the reproduced color are the same under a given light source, it is by no means certain that the XYZ values of the original color and the XYZ values of the reproduced color will be the same under a different light source. The colorimetric color reproduction method guarantees a precision in the color reproduction only under a particular light emission source. In addition, a spectral sensitivity property $\bar{x}(\lambda), \bar{y}(\lambda), \bar{z}(\lambda)$ of the human eye is an average spectral sensitivity property, meaning that a color will not necessarily be perceived as the same color by all people, even if their tristimulus values are equal.

For the foregoing reasons, if the coloring materials with varying intensities, such as C and Lc, M and Lm, C and M, or LC and M, for example, possess their own respective different isochromatic property, the coloring materials will appear to be different respective colors depending on a change in the light emission source or a characteristic of a particular observer, no matter how much, as per Japanese Patent Laid Open No. 2000-343731, the graininess is improved. Consequently, graininess may end up being degraded in some instances. Also, in some instances, the change in the light emission source or the characteristic of the particular observer may result in degraded tone characteristics, giving rise to a pseudo contour as a consequence, no matter how much, as per Japanese Patent Laid Open No. 2004-058622, the overall coloring material quantity is changed contiguously.

SUMMARY OF THE INVENTION

The present invention resolves such pre-existing problems as the foregoing.

The present invention provides a color processing apparatus and a method thereof that allows obtaining an image with a good color reproducibility by contiguously changing the overall coloring material quantity.

According to an aspect of the present invention, there is provided a color processing apparatus including: an acquisition unit configured to acquire a plurality of spectral reflectance corresponding to a plurality of quantities of coloring materials; a calculation unit configured to calculate a target spectral reflectance corresponding to color data of interest, based on the plurality of spectral reflectance acquired by the acquisition unit; and a decision unit configured to decide the quantities of the coloring materials that correspond to the target spectral reflectance calculated by the calculation unit. The calculation unit is configured to calculate the target spectral reflectance such that the spectral reflectance changes contiguously among a plurality of colors that are reproduced using the quantities of coloring materials.

According to another aspect of the present invention, there is provided a computer-readable storage medium for storing a computer program for causing a computer to execute as a color processing apparatus, the program including: an acquisition step of acquiring a plurality of spectral reflectance corresponding to a plurality of quantities of coloring materials; a calculation step of calculating a target spectral reflectance corresponding to color data of interest, based on the plurality of spectral reflectance acquired in the acquisition step; and a decision step of deciding the quantities of the coloring materials that correspond to the target spectral reflectance that is calculated in the calculation step. In the calculation step, the target spectral reflectance is calculated such that the spectral reflectance changes contiguously among a plurality of colors that are reproduced with the plurality of quantities of the coloring materials.

Further, according to an aspect of the present invention, there is provided a color processing method, including: acquiring a plurality of spectral reflectance corresponding to a plurality of quantities of coloring materials; calculating a target spectral reflectance corresponding to color data of interest, based on the plurality of spectral reflectance acquired; and deciding the quantities of the coloring materials that correspond to the target spectral reflectance that is calculated In the calculation, the target spectral reflectance is calculated such that the spectral reflectance changes contiguously among a plurality of colors that are reproduced with the plurality of quantities of the coloring materials.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the present invention will be described below in detail with reference to the accompanying drawings. The following embodiments do not limit the claims of the present invention, and not all combinations of features described in the embodiments are essential to the present invention.

The description begins with an overview of an exemplary embodiment which specifies a gradation that a user may want to calibrate followed by a performance of a color measurement of a patch image. Also described is a color separation process that contiguously changes spectrally by reading in a spectral reflectance data of the patch image that has been measured.

Figure 1:
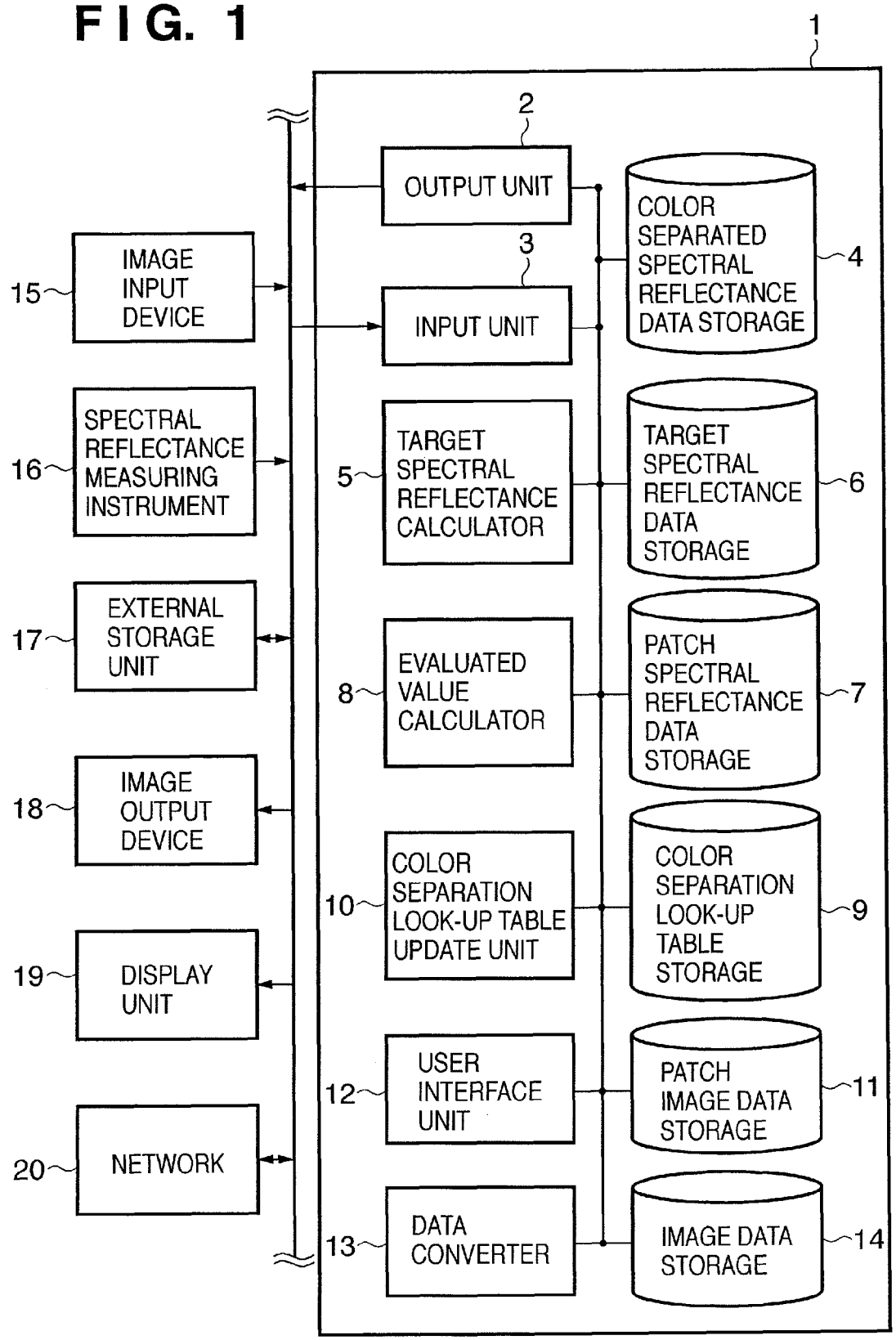
FIG. 1 is a block diagram depicting an assembly of a system that includes an image processing apparatus.

FIG. 1 is a block diagram illustrating an assembly of a system that includes an image processing apparatus according to a first exemplary embodiment of the present invention.

First is a description of an assembly of an image processing apparatus 1. An output unit 2 displays an image data and a user interface. An input unit 3 inputs spectral reflectance data that is measured by a spectral reflectance measuring instrument 16, as well as an image data that is input via an image input device 15. A color separated spectral reflectance data storage 4 stores the spectral reflectance data after the color separation, for example, storing the spectral reflectance data that is matched to an RGB value combination that can be ascertained. A target spectral reflectance calculator 5 calculates the spectral reflectance data that is a target. A target spectral reflectance data storage 6 stores the spectral reflectance data that is the target that is calculated by the target spectral reflectance calculator 5. A patch spectral reflectance data storage 7 stores spectral reflectance data that is a result of measuring a printed patch with the spectral reflectance measuring instrument 16. An evaluated value calculator 8 calculates an evaluated value for the target spectral reflectance data that is stored in the target spectral reflectance data storage 6, and the spectral reflectance data of the patch that is stored in the patch spectral reflectance data storage 7. A color separation look-up table (LUT) storage 9 stores a look-up table (LUT) that is linked to a color data of an inputted color space, such as RGB values, for example, and a combination of the coloring materials as pertains to an image output device 18, for example, CMYK values. A color separation look-up table update unit 10 updates a color separation look-up table that is stored in the color separation look-up table storage 9 in accordance with the evaluated value that is calculated by the evaluated value calculator 8. A patch image data storage 11 stores image data for use in a patch. A user interface unit 12 controls a user interface. A data converter 13 converts the spectral reflectance data into L*a*b* values and the like. An image data storage 14 stores the image data that is inputted via the input unit 3.

The image input unit 15 may be a digital camera or a scanner and the like. The image processing apparatus 1 inputs image data from the image input unit 15. The spectral reflectance measuring instrument 16 obtains the spectral reflectance data by measuring the spectral reflectance of the printed image or the patch image. An external storage unit 17 is a large capacity storage device, such as a hard drive or a CD-ROM. An image output device 18 is a color printer, such as an inkjet printer. A display unit 19 displays an image in accordance with the image data that is output from the image processing apparatus 1. A network 20 is a network such as the Internet.

Figure 2:
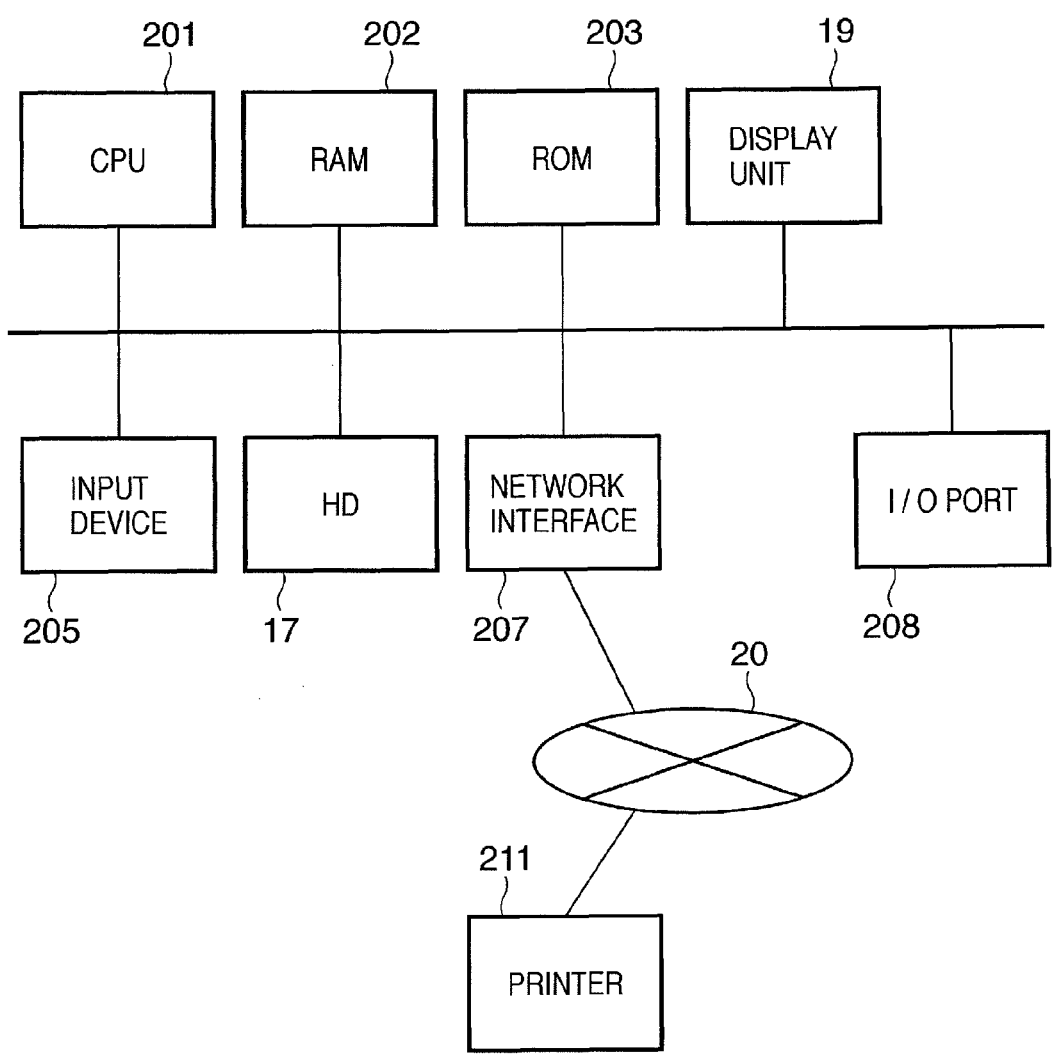
FIG. 2 is a block diagram illustrating a hardware assembly of the image processing apparatus.

FIG. 2 is a block diagram illustrating a hardware assembly of the image processing apparatus 1. In FIG. 2, the external storage unit 17 and the display unit 19 are incorporated into the image processing apparatus 1, but those may be separated from the image processing apparatus 1 as shown in FIG. 1.

A CPU 201 controls overall operation of the image processing apparatus 1 according to a program that is stored in a RAM 202 and a ROM 203. The RAM 202 is used as a main memory of the CPU 201, and the program that is executed by the CPU 201 is loaded in the RAM 202, which also offers a workspace wherein each respective type of data that is generated by the CPU 201 during the control operation is temporarily saved. The ROM 203 stores a boot program and each respective type of data in a nonvolatile form. An input device 205, which includes a keyboard and a pointing device, such as a mouse, is used for input, by way of a user operation, of each respective type of data or command. The display unit 19, which includes a display unit such as a CRT or an LCD, is used for displaying data to be processed or a user interface screen to be described hereinafter, among other possibilities. The external storage device (HD) 17 is a large capacity storage device having stored thereon, an operating system, each respective type of application or printer driver, and data, among other possibilities. When an instruction is given for the program to launch, the program is loaded into the RAM 202 and executed. A network interface 207 controls an interface with the network 20, such as a LAN. An I/O port 208, which may be an interface such as, e.g., a USB or IEEE 1394 interface, connects to the external instrument 15, 16, or 18 that are depicted in FIG. 1, as well as an external apparatus. A printer 211 is connected to the network 20 and prints an image based on image data supplied via the network 20.

While a component that executes each respective feature set of the image processing apparatus 1 that is depicted in FIG. 1 is achieved by the CPU 201 and the control program thereof, it is permissible for a hardware to be established to fulfill the feature set. While the storage units 4, 6, 7, 9, 11, and 14 in FIG. 1 are established of either the ROM 203 or the hard disk 17, it is also permissible for a fixed data storage to be established in the ROM 203.

<User Interface>

Figure 3:
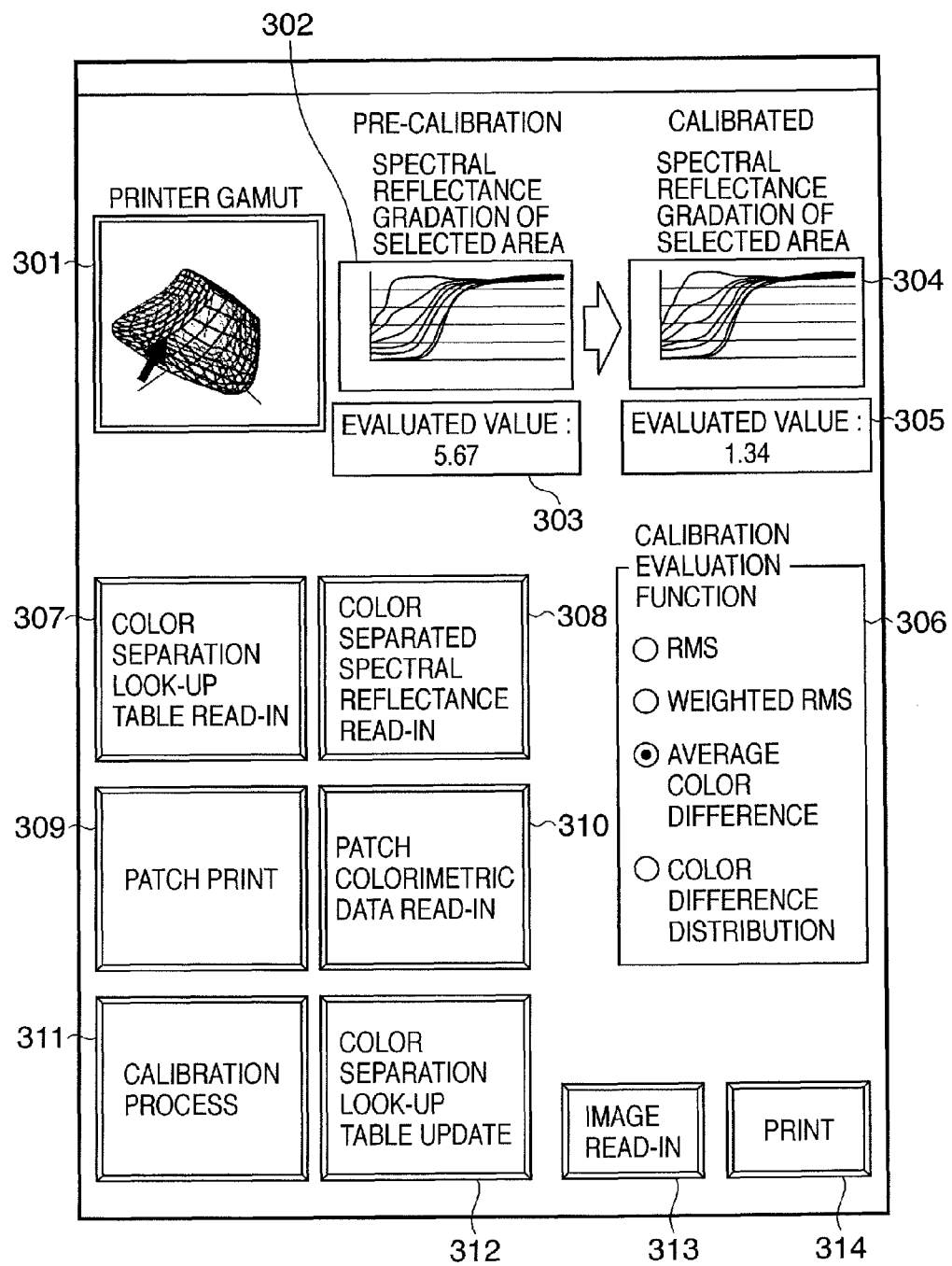
FIG. 3 illustrates an example of a user interface that is displayed in a display unit by a user interface unit of the image processing apparatus.

FIG. 3 illustrates an example of a user interface that is displayed by the display unit 19 by the user interface unit 12 of the image processing apparatus 1.

A printer gamut display section 301 provides a 3-D display of a gamut, i.e., a color reproduction area, of a printer, i.e., the image output device 18 that is being used for printing. A user is able to give an instruction for a gradation unit for which a calibration is desired by using a mouse cursor or other device to select and instruct a desired color area within the displayed gamut of the printer. A pre-calibration spectral reflectance gradation display section 302 displays a graph of a pre-calibration spectral reflectance data within the gradation component that the user instructs in the printer gamut display section 301. A pre-calibration evaluated value display section 303 displays an evaluated value of the pre-calibration spectral reflectance data for targeted spectral reflectance data that is calculated using an evaluation function to be described hereinafter. A calibrated spectral reflectance gradation display section 304 displays a graph of a spectral reflectance data subsequent to executing a calibration process for the gradation component that the user instructs. A calibrated evaluated value display section 305 displays an evaluated value of the post-calibration spectral reflectance data for targeted spectral reflectance data that is calculated using an evaluation function to be described hereinafter. A calibration evaluation function selection section 306 displays items for selecting the evaluation functions. According to the example shown in FIG. 3, the evaluation functions that are displayed as available to be selected are Root Mean Square (RMS), Weighted RMS, Average Color Difference, and Color Difference Distribution.

A color separation look-up table read-in button 307 instructs that the color separation look-up table be read in from the color separation look-up table storage 9. A color separated spectral reflectance read-in button 308 instructs that the post-color separation spectral reflectance data be read in from the color separated spectral reflectance data storage 4. A patch print button 309 instructs a patch print by way of the image output device 18, for use in calibration. A patch calorimetric data read-in button 310 instructs that a patch is printed by the image output device 18 and the patch is measured by the spectral reflectance measurement instrument 16 to get the calorimetric data of the patch. A calibration process button 311 instructs to commence the calibration process. A color separation look-up table update button 312 instructs that the color separation look-up table be updated and stored in the color separation look-up table storage 9. An image read-in button 313 instructs that an image be read in via the image input device 15, and a print button 314 instructs that the image be printed via the output device 18.

<Overall Process Flow>

FIG. 4 through FIG. 7 are flowcharts illustrating a process flow of the image processing apparatus 1. The program that executes the process is installed on the external storage unit (HD) 17, wherefrom it is loaded into the RAM 202 and executed under control of the CPU 201 at time of execution.

In step S1, the process waits for the color separation look-up table read-in button 307 to be instructed. The step determines whether or not the color separation look-up table read-in button 307 has been clicked or specified by the mouse or other pointing device or the keyboard of the input device 205. It is presumed in the following description that the instruction of the displayed button is performed by a similar operation. When the color separation look-up table read-in button 307 is instructed (YES in step S1), the process proceeds to step S2, wherein the color separation look-up table data is read in from the color separation look-up table storage 9, in a manner to be described in detail hereinafter. The process then proceeds to step S3, wherein the process waits for the color separated spectral reflectance read-in button 308 to be instructed, whereupon the process proceeds to step S4, wherein the color separation spectral reflectance data pertaining to the image output device 18 is read out, in a manner to be described in detail hereinafter, from such as the spectral reflectance measuring instrument 16, the external storage unit 17, or the network 20, and stored in the color separated spectral reflectance data storage 4. If the color separation spectral reflectance data pertaining to the image output device 18 is already stored in the color separated spectral reflectance data storage 4, it is permissible to omit the process steps S3 and S4. The process then proceeds to step S5, wherein the color separation spectral reflectance data that is stored in the color separated spectral reflectance data storage 4 is read out, converted to the L*a*b* values via the data converter 13, and displayed on the printer gamut display section 301. The processes up to the present point extends to the display of the user interface that is depicted in FIG. 3.

The process then proceeds to step S6, wherein the process waits for designation by the user of a gradation area of the printer gamut display section 301 for calibration, whereupon the process proceeds step S7 (FIG. 5), wherein the spectral reflectance data in the spectral reflectance data stored in the color separated spectral reflectance data storage 4, corresponding to the gradation area that is instructed in step S6, is read out and displayed in the pre-calibration spectral reflectance gradation display section 302.

The process then proceeds to step S8, wherein the process waits for the patch print button 309 to be instructed, whereupon the process proceeds to step S9, wherein the image data for use in a patch that is stored in the patch data storage 11 is read out, output to the image output device 18 via the output unit 2 to print the patch. The process then proceeds to step S10, wherein the color of the patch that was printed in step S9 is measured by use of the spectral reflectance measuring instrument 16. The process then proceeds to step S1, wherein the process waits for the patch calorimetric data read-in button 310 to be instructed, whereupon the process proceeds to step S12, wherein the patch spectral reflectance data that was measured in step S10 is stored in the patch spectral reflectance data storage 7, and the process proceeds to step S13 (FIG. 6).

Figure 6:
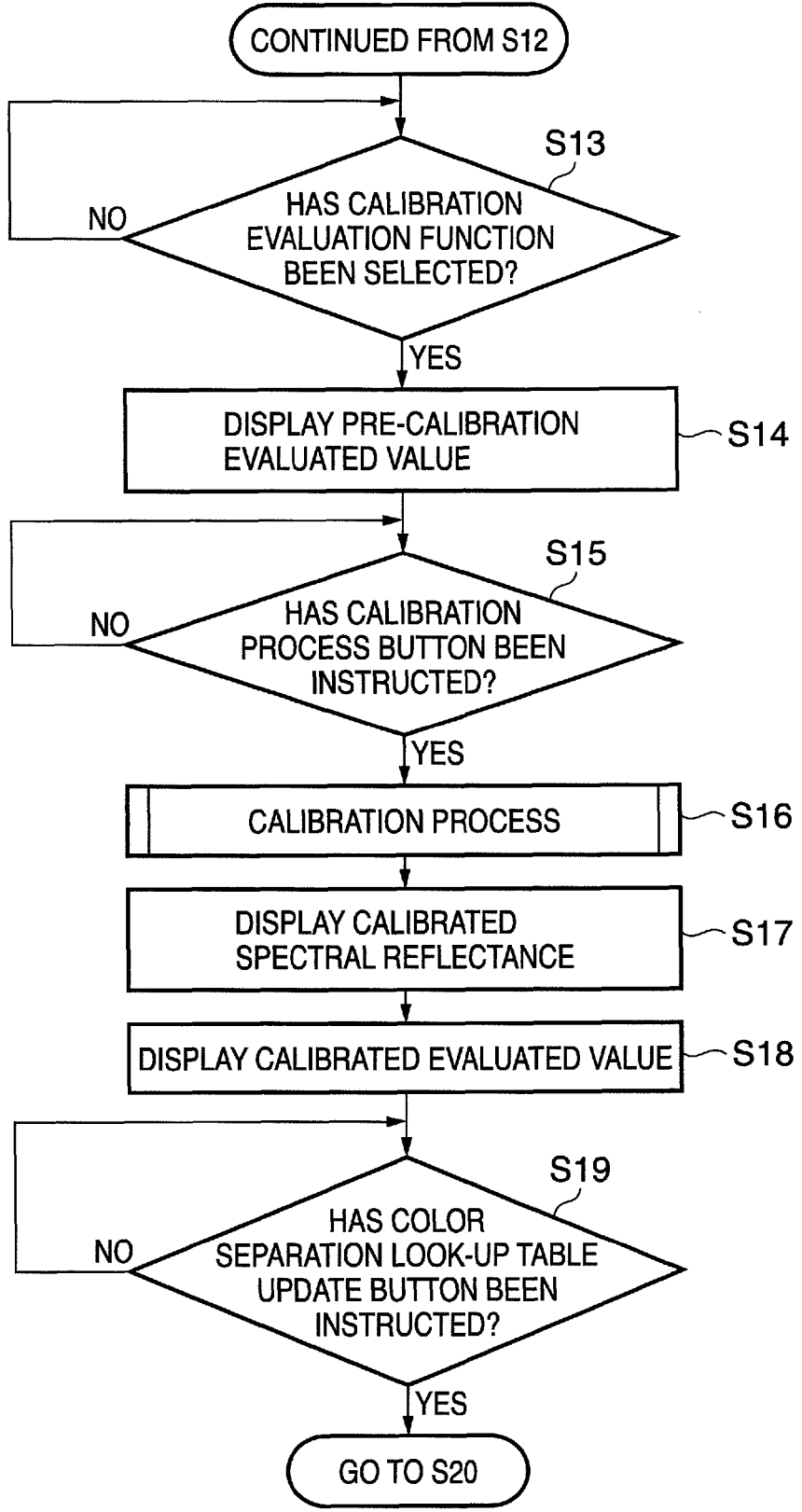
Figure 7:
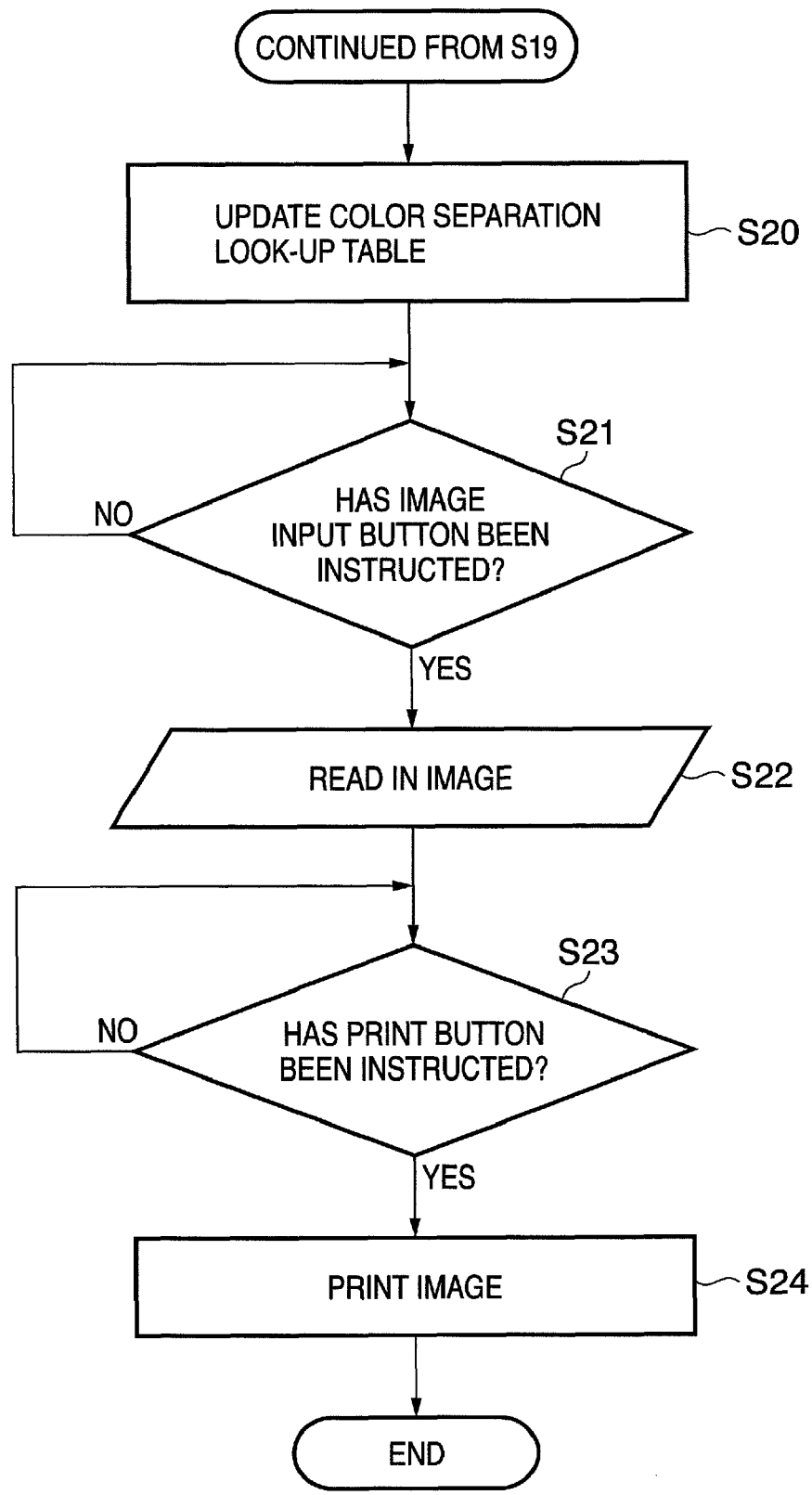

In FIG. 6, step S13, the process waits for the calibration evaluation function to be selected in the calibration evaluation function selection section 306, whereupon the process proceeds to step S14, wherein the pre-calibration evaluated value is calculated by the evaluated value calculator 8, in a manner to be described in detail hereinafter, and the evaluated value so calculated is displayed in the pre-calibration evaluated value display section 303. The process then proceeds to step S15, wherein the process waits for the calibration process button 311 to be instructed, whereupon the process proceeds to step S16, wherein the calibration process is performed in accordance with the calibration evaluation function that was selected in step S13, in a manner to be described in detail hereinafter. The process then proceeds to step S17, wherein the calibrated spectral reflectance data is displayed by the calibrated spectral reflectance gradation display section 304. The process then proceeds to step S18, wherein the calibrated evaluated value is calculated by the evaluated value calculator 8, and the evaluated value so calculated is displayed in the calibrated evaluated value display section 305. The process then proceeds to step S19, wherein the process waits for the color separation look-up table update button 312 to be instructed, whereupon the process proceeds to step S20 (FIG. 7), wherein the color separation look-up table update unit 10 updates the color separation look-up table that is stored in the color separation look-up table (LUT) storage 9. The color separation look-up table in the color separation look-up table (LUT) storage 9 is thus optimized, and the color separation look-up table so updated is used in the subsequent process when the color separation of the inputted image data is executed.

The process then proceeds to step S21, wherein the process waits for the image read-in button 313 to be instructed, whereupon the process proceeds to step S22, wherein the image data to be processed is input via the input unit 3 from either the image input device 15, the external storage unit 17, or the network 20, and stored in the image data storage 14. The process then proceeds to step S23, wherein the process waits for the print button 314 to be instructed, whereupon the process proceeds to step S24, wherein the color separation look-up table that is stored in the color separation look-up table (LUT) storage 9 is employed to convert the image data to the print data. In turn, the print data is output to the image output device 18 via the output unit 2, and the image is printed by the image output device 18.

<Color Separation Look-Up Table>

An exemplary color separation look-up table links the RGB values of the inputted image with the combination of a quantity of the coloring material after the color separation process. A look-up table that links RGB values that is derived using a conventional method such as that described in the Japanese Patent Laid Open No. 2000-343731 with the combination of the quantity of the coloring material after the color separation process, is read out as an initial color separation look-up table.

<Color Separation Spectral Reflectance Data>

Exemplary color separation spectral reflectance data involves partitioning the inputted RGB values into blocks at equal intervals, and using the spectral reflectance measuring instrument 16 to measure the patch that is printed via the image output device 18 for each respective block. For example, the spectral reflectance data is employed for a 729-color patch image that converts each respective RGB value at a 32 level interval from zero to 255.

<Patch Image Data>

Figure 8:
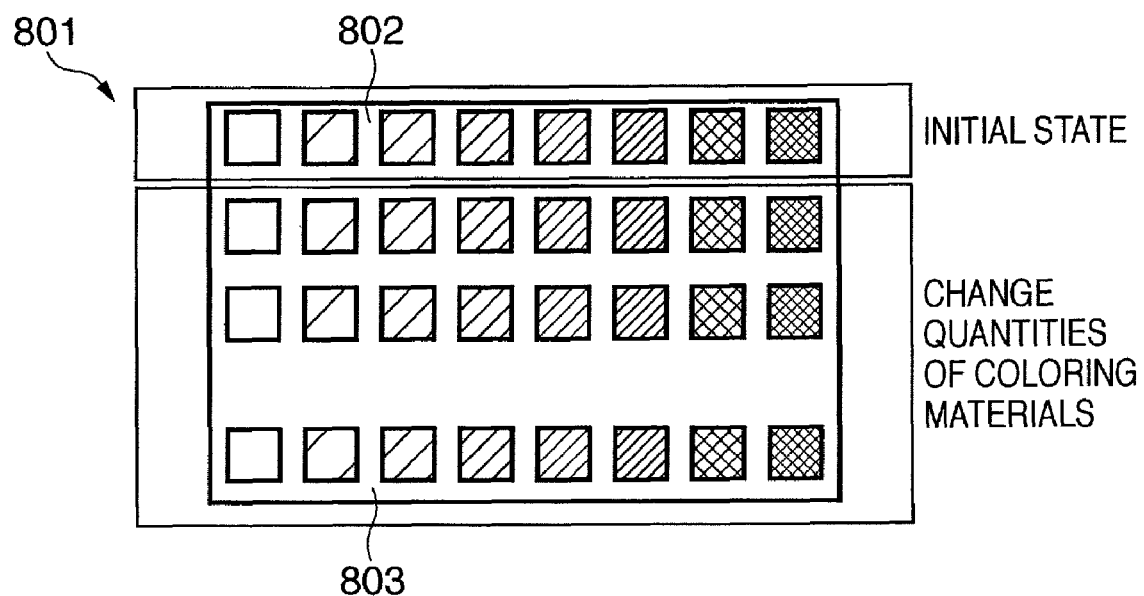
FIG. 8 illustrates an example of a patch image.

FIG. 8 depicts an example of a patch image that is printed when a calibration of a gray gradation is desired, employing the four coloring materials C, M, Y, and K. The patch image 801 includes an initial gray gradation 802 that is printed using the initial color separation look-up table and a patch 803 that is printed by changing the quantities of the C, M, Y, and K coloring materials that are used in printing in a variety vis-à-vis the initial gray gradation 802.

In such a circumstance, changing the C, M, Y, and K coloring material without restriction results in a creation of an uncountable quantity of patches. Hence, only the combination of C, M, Y, and K that is equivalent to the L*a*b*, vis-à-vis the initial gradation 802, with consideration given to the improvement of the graininess and under a particular light source, such as a D50 light source under a supplement to the CIE standards, for example, is output as the patch image. However, there is no limitation thereto. It would be permissible, for example, for the combination to be equivalent to the XYZ tristimulus values, or to change the quantities of the C, M, Y, and K coloring materials within a range that can realistically be fulfilled, centering on the initial gradation 802. No limitation is thus applicable if a method is able to output a patch that is necessary to reproduce a desired spectral reflectance. While FIG. 8 depicts an example of a gray gradation calibration, a calibration may also be achieved within a gradation area of another color.

While the example depicts a coloring material type of C, M, Y, and K, the present invention is not limited thereto. It would be permissible, for example, to employ coloring materials such as Lc, Lm, or Gr, with reduced intensity, or spot coloring materials such as R, G, or B.

<Calculation of the Evaluated Value>

Following is a description of RMS, Weighted RMS, Average Color Difference, and Color Difference Distribution, which constitute an example of the evaluation function for computing the evaluated value.

RMS may be represented by Equation (2), following, with Rref(λ) signifying the target spectral reflectance, and Rsam (λ) signifying the spectral reflectance that is to be evaluated:

$$\text{RMS} = \frac{1}{n}\sqrt{\sum_{\lambda=380}^{730}(R_{ref}(\lambda)-R_{sam}(\lambda))^2} \quad (2)$$

Herein, n is a sampling number, and when sampling at a 10 nm interval over the visible light range of between 380 nm and 730 nm, n=36. Weighted RMS is a technique of grossly evaluating an error for a given wavelength region, by applying a weighting function W(λ) to RMS. It may be represented by Equation (3), following:

$$WeightedRMS = \frac{1}{n}\sqrt{\sum_{\lambda=380}^{730}\{(R_{ref}(\lambda)-R_{sam}(\lambda))\cdot W(\lambda)\}^2} \quad (3)$$

Herein, it is permissible to assign a spectral radiance of the light source as the weighting function W(λ). It would also be permissible to use the weighting function W(λ) with consideration for a visual property. An example of such a weighting function W(λ) with consideration for the visual property would, for example, be using an equation (4), following, to calculate tristimulus values X, Y, Z that do not depend on the characteristics of a light source. It may be represented by the equation (4), with x̄(λ),ȳ(λ),z̄(λ) signifying the color matching function:

$$X = k\int_{380nm}^{780nm} R_{ref}(\lambda)\bar{x}(\lambda)d\lambda$$
$$Y = k\int_{380nm}^{780nm} R_{ref}(\lambda)\bar{y}(\lambda)d\lambda \quad (4)$$
$$Z = k\int_{380nm}^{780nm} R_{ref}(\lambda)\bar{z}(\lambda)d\lambda$$
$$\text{wherein } k = \frac{100}{\int_{380nm}^{780nm}\bar{y}(\lambda)}$$

Given that a human visual property is to have a greater sensitivity for a dark substance than for a light substance, the lighter a substance gets, the smaller the weight gets per wavelength, as per equation (5):

$$W(\lambda) = 116\times\left|\bar{y}(\lambda)\cdot Y^{-\frac{2}{3}}\right| + 500\times\left|\bar{x}(\lambda)\cdot(X)^{-\frac{2}{3}} - \bar{y}(\lambda)\cdot Y^{-\frac{2}{3}}\right| + \quad (5)$$
$$200\times\left|\bar{y}(\lambda)\cdot Y^{-\frac{2}{3}} - \bar{z}(\lambda)\cdot Z^{-\frac{2}{3}}\right|$$

A weighted function that takes a visual property into consideration is used as the evaluation function.

The average color difference changes a light source and calculates the color difference for such as a color difference ΔE, ΔE94, or ΔE2000, as defined by CIE, and derives the average color difference. It is also permissible to change the color matching function into a variety, rather than changing only the light source, and derive the average color difference.

Similarly, the color difference distribution is a color difference distribution value when changing the light source or the color matching function into a variety.

The foregoing evaluation functions are only an example, and the evaluation functions are not limited thereto, provided that the evaluation functions evaluate the error between the target spectral reflectance and the spectral reflectance in question.

<Calibration Process>

Figure 9:
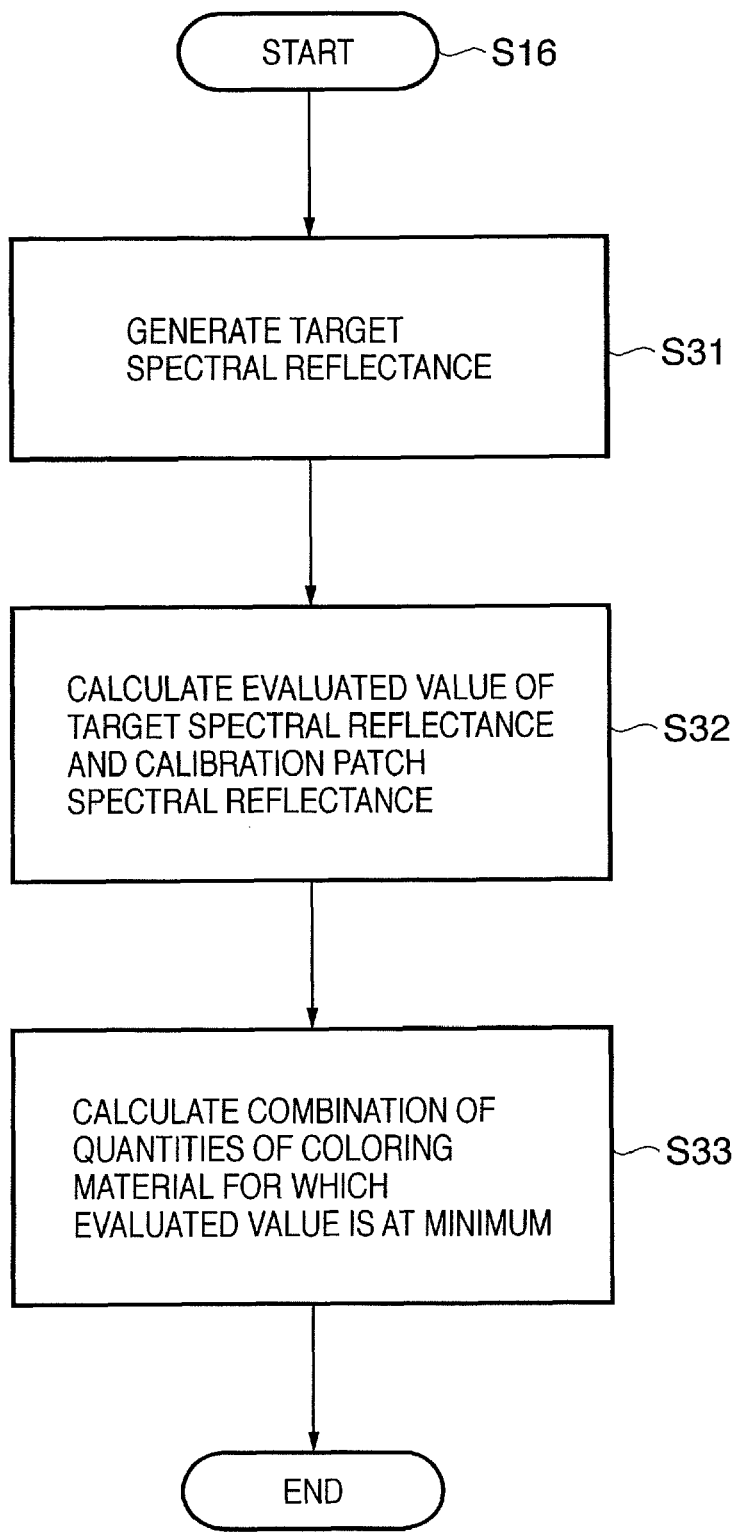
FIG. 9 is a flowchart illustrating in detail a calibration process in FIG. 6, step S16.

FIG. 9 is a flowchart illustrating in detail a calibration process in FIG. 6, step S16.

In step S31, the targeted spectral reflectance data is calculated, in a manner to be described in detail hereinafter. In step S32, an evaluated value for the targeted spectral reflectance data calculated in step S31 to the spectral reflectance data of a patch that is stored in the patch spectral reflectance data storage 7, is calculated by the evaluated value calculator 8. In step S33, the combination of the coloring materials that is the smallest of the evaluated value that is calculated in step S32 is derived.

<Target Spectral Reflectance>

The target spectral reflectance is calculated by employing an equation (6), according to the embodiment:

$$R(\lambda) = \{(1-a)R_{ink}^{1/n} + aR_{paper}^{1/n}\}^n \quad (6)$$

Rpaper (λ) signifies the spectral reflectance of a printing paper, with the coloring material quantity of zero, upon which the image is printed, Rink(λ) signifies the spectral reflectance that corresponds to the selected gradation area, a signifies the tone characteristics, and n signifies a diffusion coefficient.

For example, given the example that is depicted in FIG. 8, the target spectral reflectance is calculated for the gray gradation.

Figure 10:
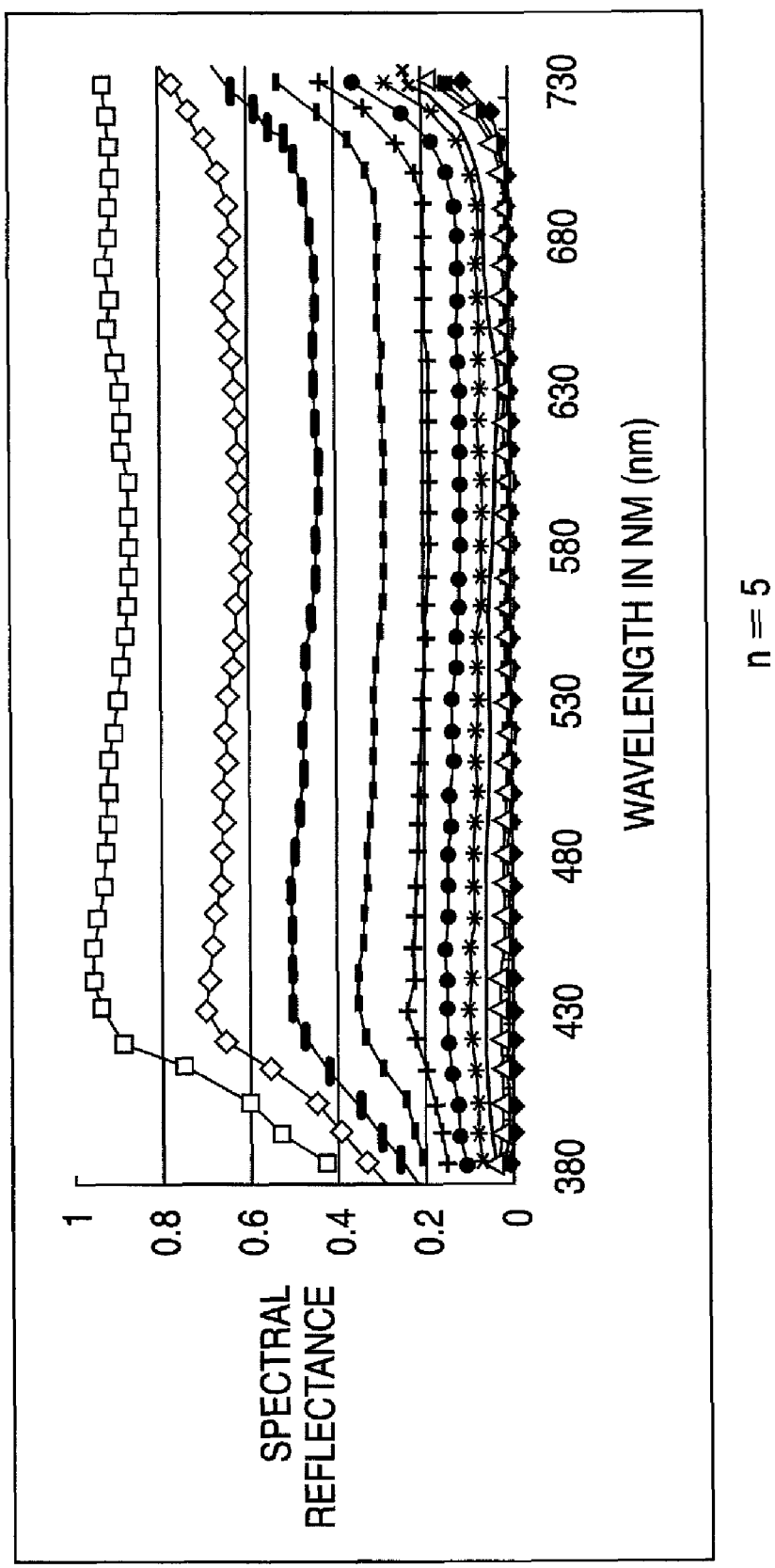
FIG. 10 is a graph illustrating a target spectral reflectance that is calculated using an equation.

FIG. 10 is a graph illustrating a target spectral reflectance that is calculated using an equation (6) FIG. 10 depicts a result that is derived from the spectral reflectance data of a printed material that is printed using the coloring materials, each of which varies in brightness, versus each respective wavelength, with the higher plotted measured values of the coloring materials signifying the higher brightness, or intensity.

Figure 11A:
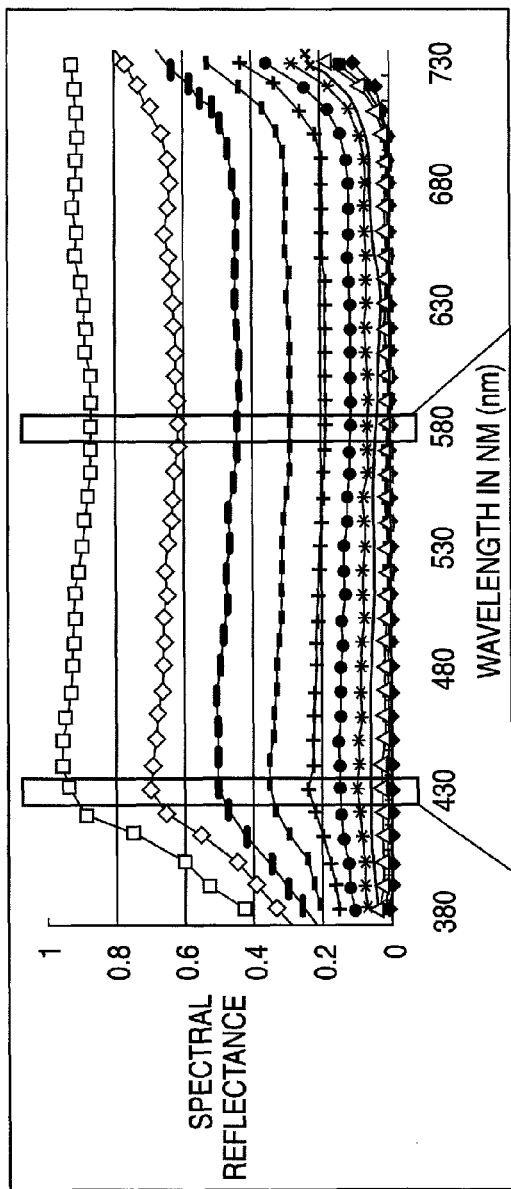
FIGS. 11A through 11C are graphs illustrating contiguous spectral change.
Figure 11C:
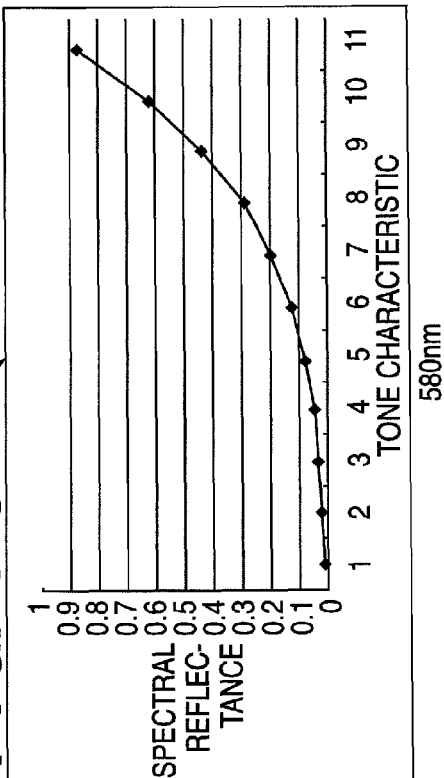
Figure 11B:
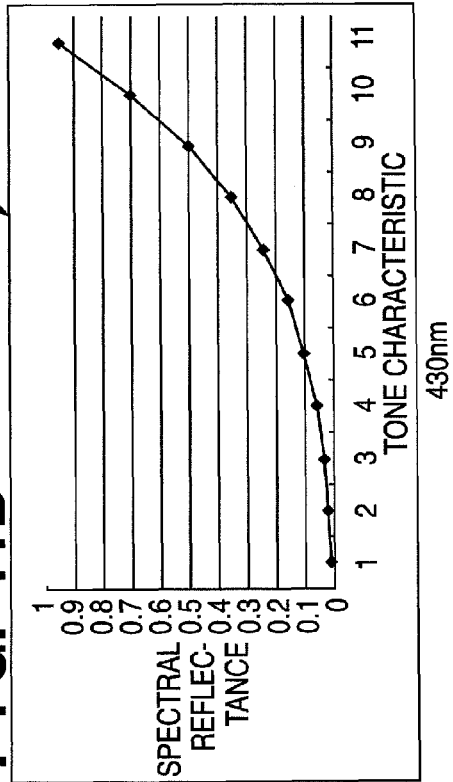

FIGS. 11A through 11C are graphs illustrating contiguous spectral change and illustrate a result that is obtained through a property that changes contiguously spectrally.

FIGS. 11B and 11C respectively depict the spectral reflectance versus each respective tone characteristic for a wavelength of 430 nm and 580 nm. It is clear that the spectral reflectance changes contiguously versus each respective tone characteristic. Given the spectral reflectance data that satisfies the target spectral reflectance, it is possible to verify that the spectral reflectance changes contiguously versus the tone characteristics.

According to the first exemplary embodiment, a user specifies the gradation to be calibrated, prints the patch to be calibrated, and measures the color of the printed patch. By reading out the spectral reflectance data thus measured, it is possible to achieve the color separation process that changes contiguously, spectrally. In such circumstance, it is possible for the user to specify the evaluation function and process the color separation while examining the evaluated value.

Following is a description of the image processing apparatus 1a, according to a second exemplary embodiment.

Following is a description of an overview of the second embodiment, wherein a print model is employed to estimate the spectral reflectance, rather than printing the patch image to be calibrated, as in the first embodiment. The optimization method is used to calculate the combination of quantities of the coloring materials that reproduce the target spectral reflectance. Finally, the color separation process is performed for contiguous spectral changing.

Figure 12:
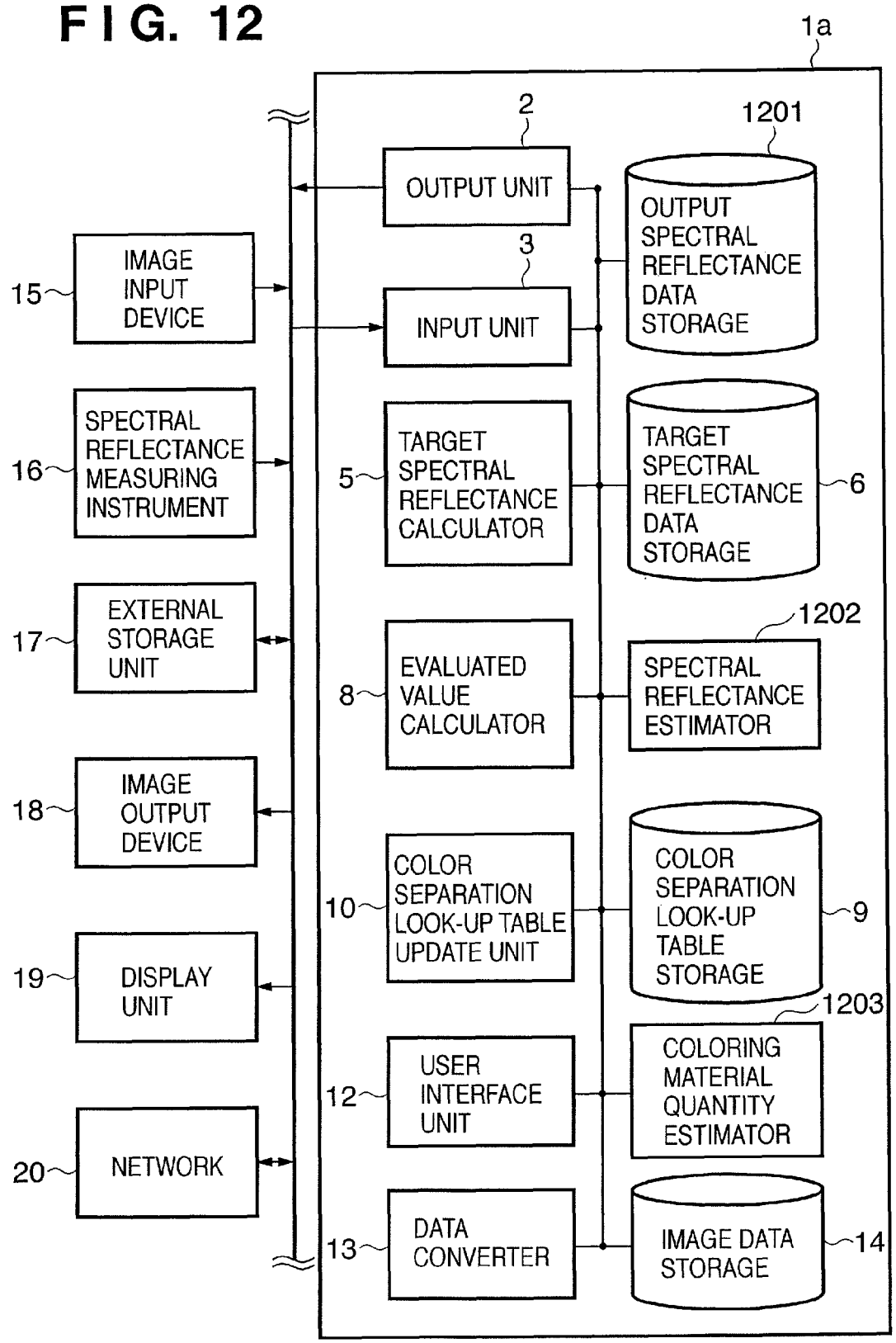
FIG. 12 is a block diagram illustrating an assembly of a system that includes an image processing apparatus.

FIG. 12 is a block diagram illustrating an assembly of a system that includes an image processing apparatus 1a according to the second exemplary embodiment. Elements in FIG. 12 that are common to those in FIG. 1 will be shown with the same reference number as in FIG. 1, and their descriptions will not be repeated.

An output spectral reflectance data storage 1201 in the image processing apparatus 1a according to the second embodiment stores the spectral reflectance data corresponding to a model of the image output device 18, when each respective coloring material is employed in printing. A spectral reflectance estimator 1202 employs the spectral reflectance data that is stored in the output spectral reflectance data storage 1201 to estimate the spectral reflectance of an image printed with the image output device 18. The evaluated value calculator 8 calculates an evaluated value of the spectral reflectance data that is estimated by the spectral reflectance estimator 1202, for the target spectral reflectance data that is stored in the target spectral reflectance data storage 6. A coloring material quantity estimator 1203 estimates the quantities of the coloring materials that correspond to the spectral reflectance data of the inputted image. The rest of the assembly is identical to the assembly of the image processing apparatus 1, according to the first exemplary embodiment.

A hardware assembly of the image processing apparatus 1a according to the second embodiment is identical to the assembly depicted in FIG. 2, and thus, a description thereof is not repeated.

Figure 13:
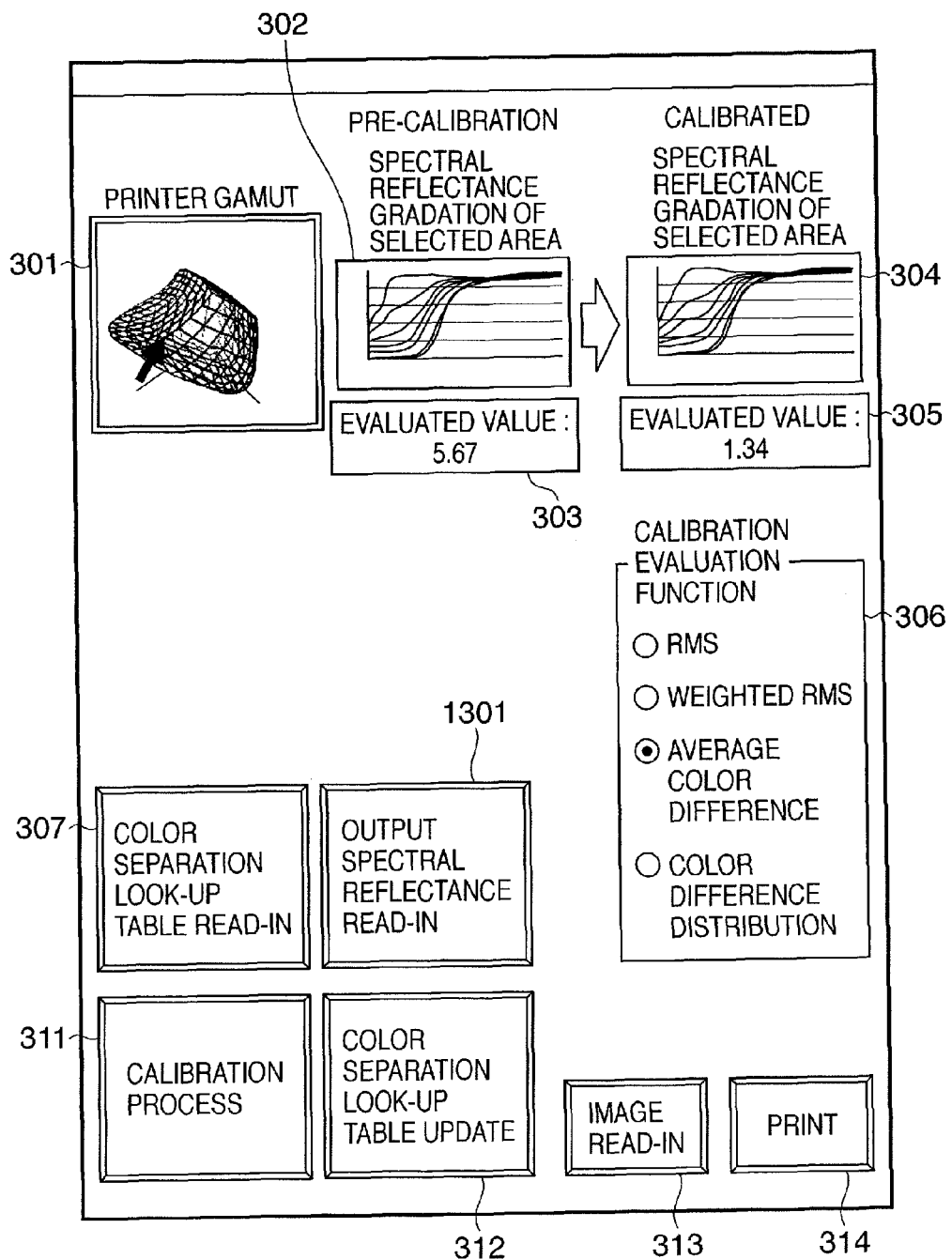
FIG. 13 illustrates an example of a user interface that is displayed on a display unit by a user interface unit of the image processing apparatus.

FIG. 13 illustrates an example of a user interface that is displayed on the display unit 19 by the user interface unit 12 of the image processing apparatus 1a, according to the second embodiment. Elements that are common between the user interface shown in FIG. 13 and the user interface shown in FIG. 3 will be depicted with the same reference numbers as in FIG. 3, and their descriptions will not be repeated.

An output spectral reflectance read-out button 1301 instructs a reading-out of an output spectral reflectance data of the image output device 18, which is stored in the output spectral reflectance data storage 1201.

<Overall Process Flow>

FIG. 14 through FIG. 17 are flowcharts that illustrate a process flow within the image processing apparatus 1a, according to the second embodiment. Unlike the first embodiment, the output spectral reflectance data is read out, in a manner to be described in detail hereinafter, according to the second embodiment, rather than the color spectral reflectance data. The printing and the color measurement of a patch are omitted according to the second embodiment.

Figure 4:
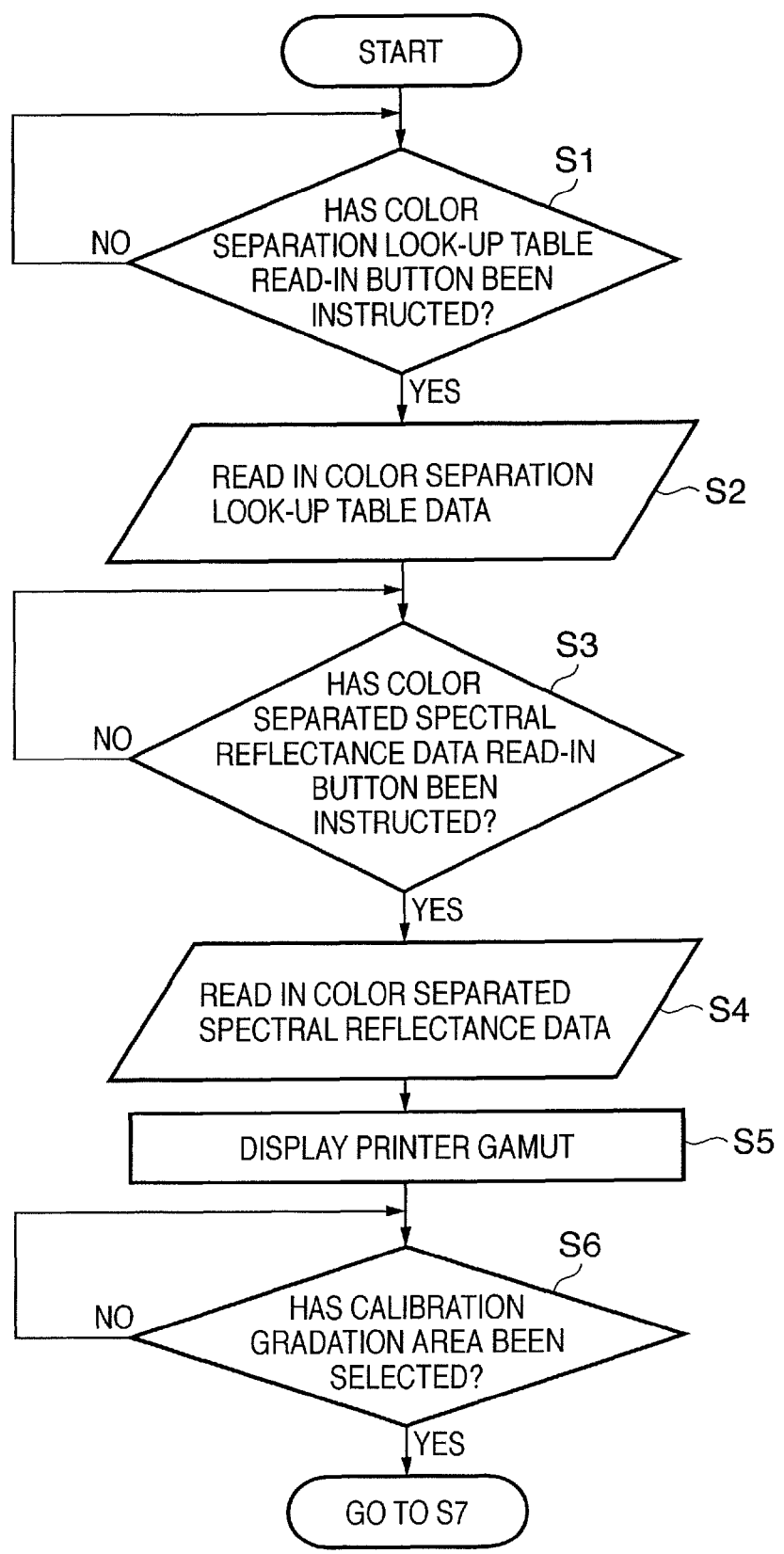
FIGS. 4 through 7 are flowcharts illustrating a process flow of the image processing apparatus.
Figure 5:
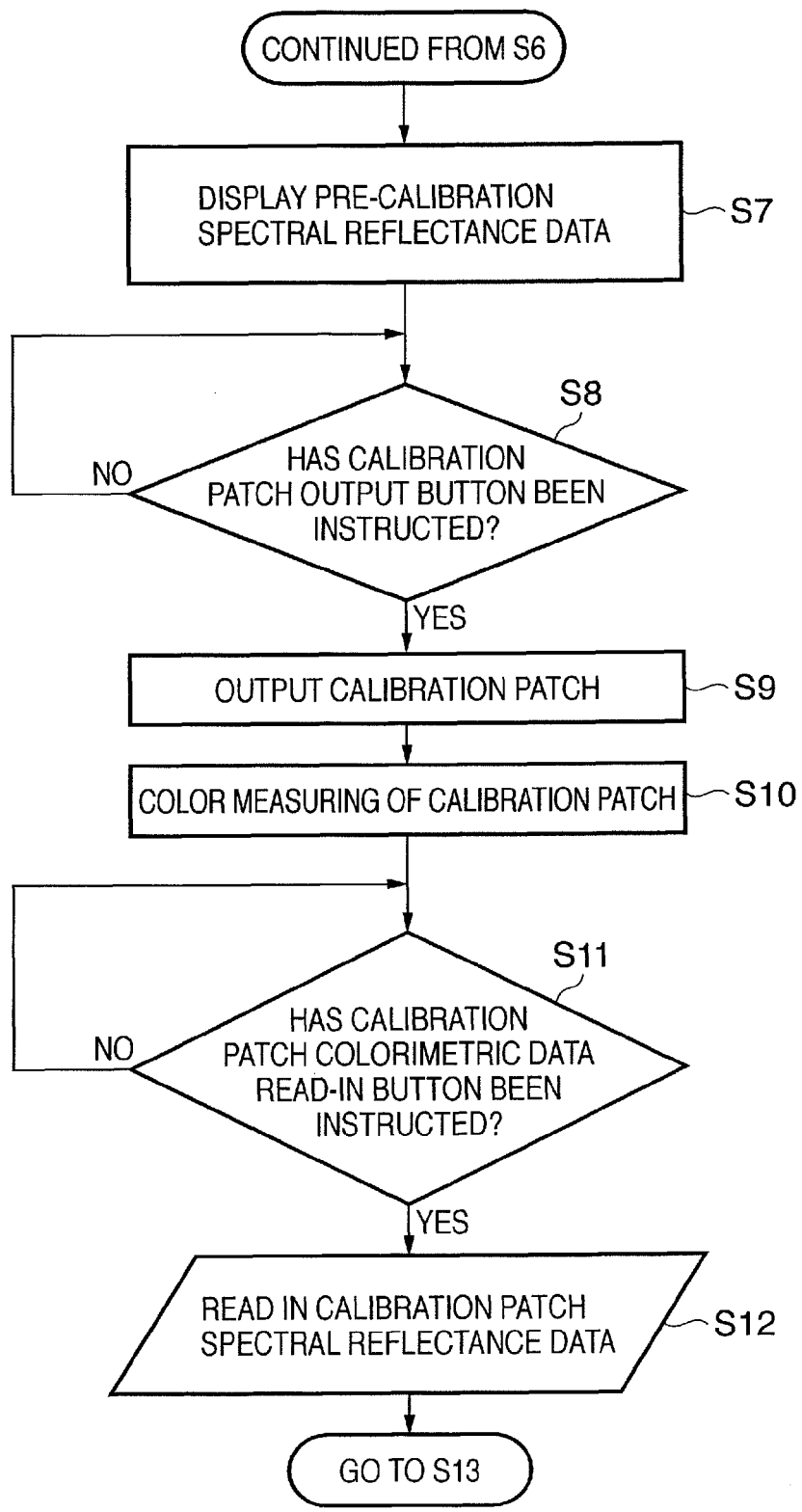

In step S41, the process waits for the color separation look-up table read-in button 307 to be instructed, whereupon the process proceeds to step S42, wherein the color separation look-up table data is read in from the color separation look-up table storage 9, as per FIG. 4, steps S1 and S2. In step S43, the process waits for the output spectral reflectance data read-in button 1301 to be instructed, whereupon the process proceeds to step S44, wherein the output spectral reflectance data of the image output device 18 is obtained from such as the spectral reflectance measuring instrument 16, the external storage unit 17, or the network 20, and is stored in the output spectral reflectance data storage 1201.

Figure 15:
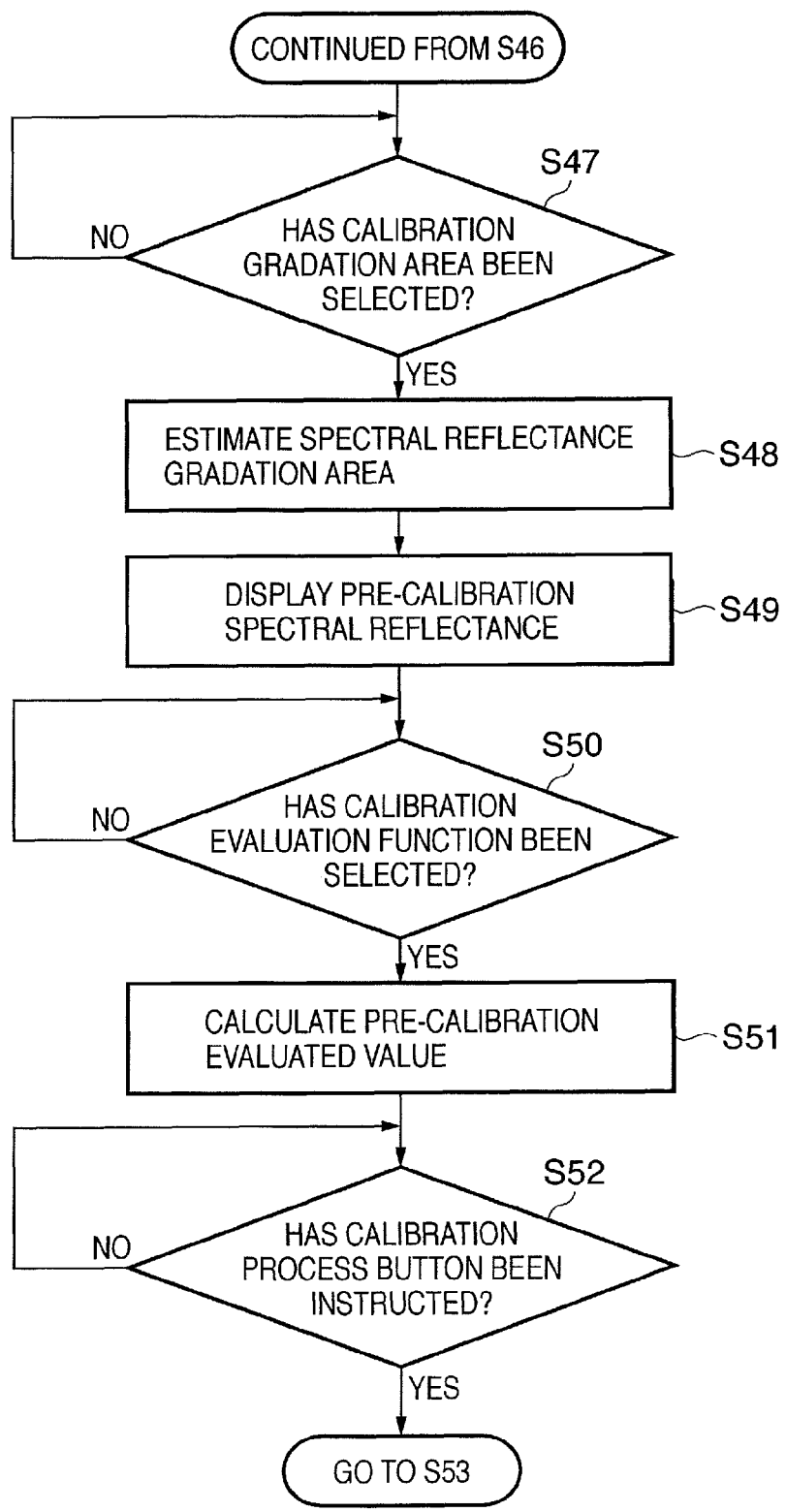

The process then proceeds to step S45, wherein the output spectral reflectance data that is stored in the output spectral reflectance data storage 1201 and the color separation look-up table that is stored in the color separation look-up table storage 9 are employed to estimate a gamut of the image output device 18, i.e., a printer, in a manner to be described in detail hereinafter. The process then proceeds to step S46, wherein the printer gamut that was estimated in step S45 is displayed in the printer gamut display section 301, and the process then proceeds to step S47 (FIG. 15).

Figure 16:
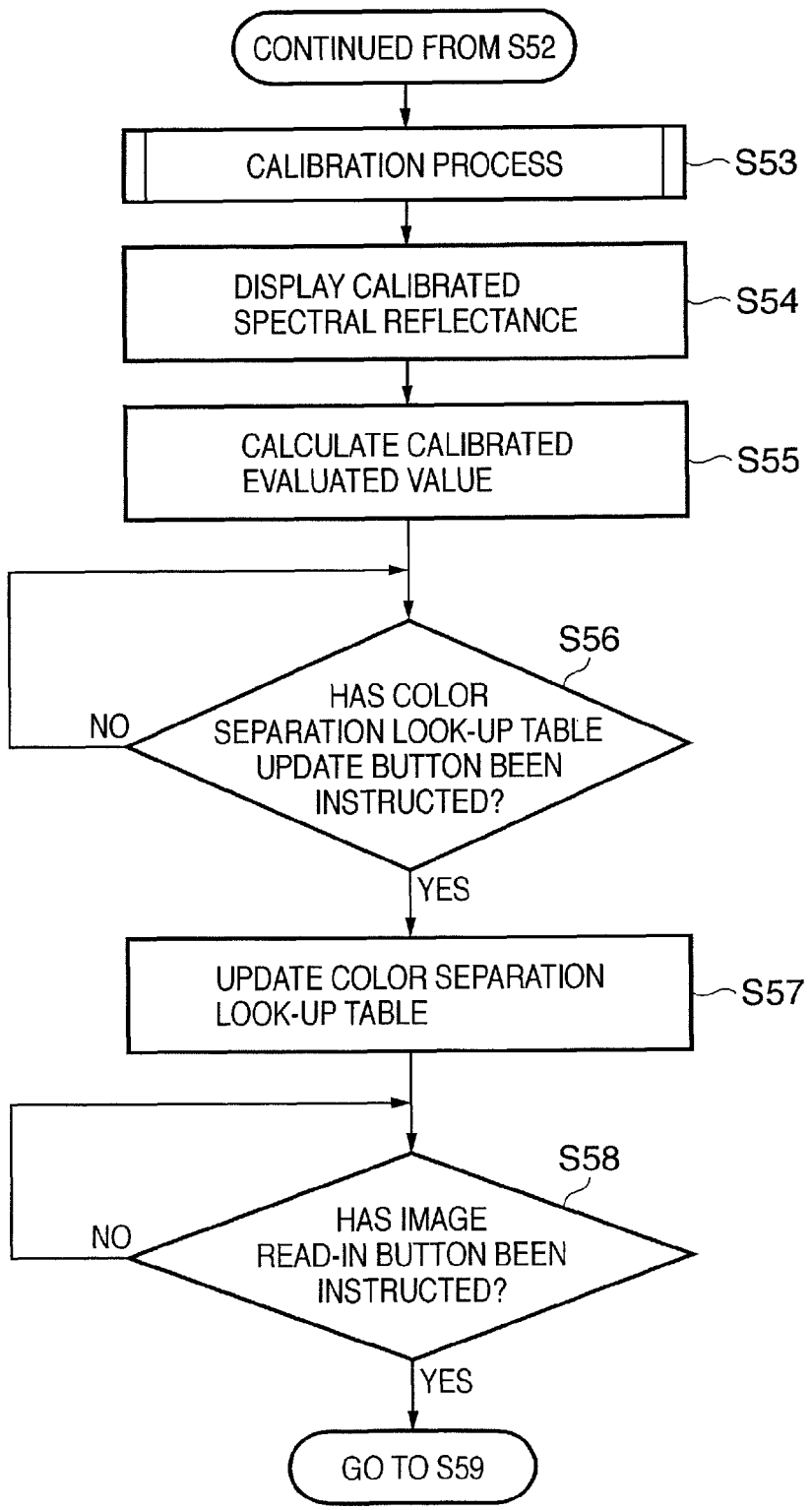

In step S47, the process waits in the printer gamut display section 301 for a user to select and instruct a gradation area for which a calibration is desired, and proceeds to step S48 when the area is so instructed. In step S48, the output spectral reflectance data that is stored in the output spectral reflectance data storage 1201 and the color separation look-up table that is stored in the color separation look-up table storage 9 are employed to estimate the spectral reflectance of the gradation area that is selected in step S47, in a manner to be described in detail hereinafter. The process then proceeds to step S49, wherein the spectral reflectance data that is estimated in step S48 is displayed in the pre-calibration spectral reflectance gradation display section 302, and the process then proceeds to step S50, wherein the process waits for a calibration evaluation function to be selected in the calibration evaluation function selection section 306, whereupon the process proceeds to step S51, wherein the pre-calibration evaluated value is calculated by the evaluated value calculator 8, in a manner to be described in detail hereinafter, and the evaluated value thus calculated is displayed in the pre-calibration evaluated value display section 303. The process then proceeds to step S52, wherein the process waits for the calibration process button 311 to be instructed, whereupon the process proceeds to step S53 (FIG. 16).

In step S53, the calibration process is performed, in accordance with the calibration evaluation function that is selected in step S50, in a manner to be described in detail hereinafter. The process then proceeds to step S54, wherein the spectral reflectance data that is calibrated in step S53 is displayed in the calibrated spectral reflectance gradation display section 304. The process then proceeds to step S55, wherein the calibrated evaluated value is calculated by the evaluated value calculator 8, and the evaluated value thus calculated is displayed in the calibrated evaluated value display section 305. In step S56, the process waits for the color separation look-up table update button 312 to be instructed, whereupon the process proceeds to step S57, wherein the color separation look-up table that is stored in the color separation look-up table storage 9 is updated, using the color separation look-up table update unit 10. Thus, the color separation look-up table in the color separation look-up table storage 9 is optimized. A successive image process will use the updated color separation look-up table to execute a color separation of the inputted image data.

Figure 17:
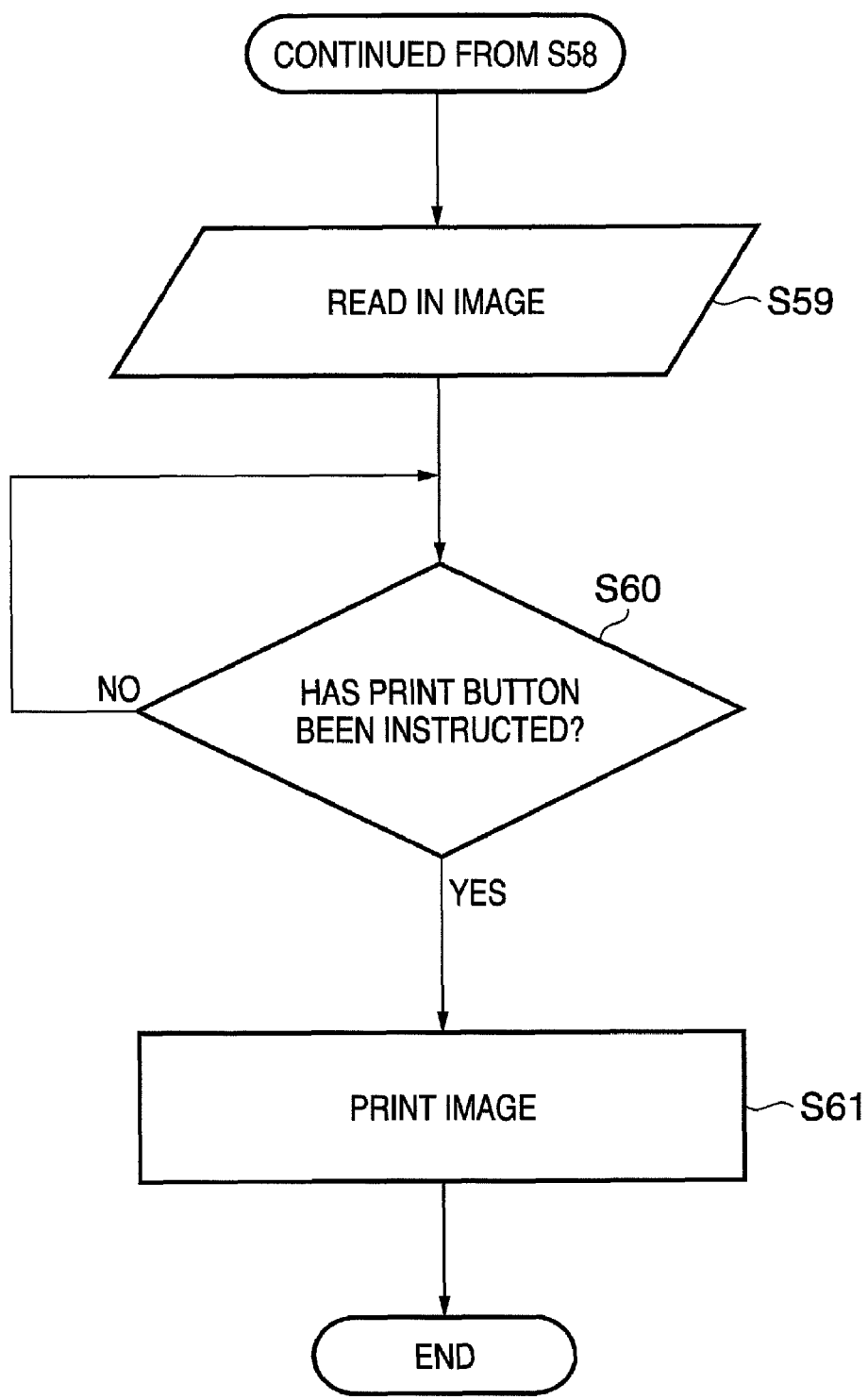

In step S58, the process waits for the image read-in button 313 to be instructed, whereupon the process proceeds to step S59 (FIG. 17). In step S59, the image data is input via the input unit 3, from either the image input device 15, the external storage unit 17, or the network 20, and stored in the image data storage 14. The process then proceeds to step S60, wherein the process waits for the print button 314 to be instructed, whereupon the process proceeds to step S61, wherein the color separation look-up table that is stored in the color separation look-up table storage 9 is employed in performing the color separation on, and generating the print data for, the image data that is stored in the image data storage 14. The print data is then output to the image output device 18 via the output unit 2, and printed.

<Calculation of the Evaluated Value>

Following is a detailed description of the evaluated value calculator 8. When calculating according to the first embodiment, the inputted spectral reflection data will already be related to the patch data for which the tone characteristics and graininess have been taken into account. According to the second embodiment, however, an optimization method, among other possibilities, is employed to determine the quantities of the coloring materials. It is thus necessary to take the tone characteristics and graininess into account when calculating the evaluated value, other than the evaluated value according to the first embodiment. For example, it is possible to describe the evaluated value according to the embodiment with an equation (7), following, employing the four coloring materials C, M, Y, and K, wherein each respective quantity of coloring materials is c, m, y, and k, the evaluation function of the tone characteristic is signified by Gr(c, m, y, k), the evaluated value of the graininess is signified by Gn(c, m, y, k), and the evaluation function according to the first embodiment is signified by E(c, m, y, k):

$$\text{Evaluated value} = w1 * Gr(c,m,y,k) + w2 * Gn(c,m,y,k) + w3 * E(c,m,y,k) \quad (7)$$

The terms w1, w2, and w3 represent the weighting of each respective evaluated value. For example, w1 is set to a large value when focusing on the tone characteristic, and w2 is set to a large value when focusing on the graininess.

<Output Spectral Reflectance Data>

The output spectral reflectance data is the spectral reflectance that changes and measures quantities of the coloring materials at equal intervals. For example, with the four coloring materials C, M, Y, and K, wherein an output level of each respective quantity of coloring material is a 256 tone characteristic, it would be partitioned into 32-tone segments. It is thus possible to obtain 9×9×9×9=6561 types of the spectral reflectance data, which is treated as the output spectral reflectance data. As the total quantity of coloring materials with which a surface of the printing paper may be coated is restricted, however, it is not possible to output all of the combinations of the coloring materials.

The present invention is not limited to the 32-tone segmentation such as the foregoing, and finer segmentation is possible when higher precision is desired. The type of coloring material is not limited to the four colors. For example, a circumstance wherein the less intense coloring materials, such as Lc, Lm, or Gr, or the spot color, such as R, G, or B, are employed is permissible.

<Estimation of the Print Gamut>

Figure 14:
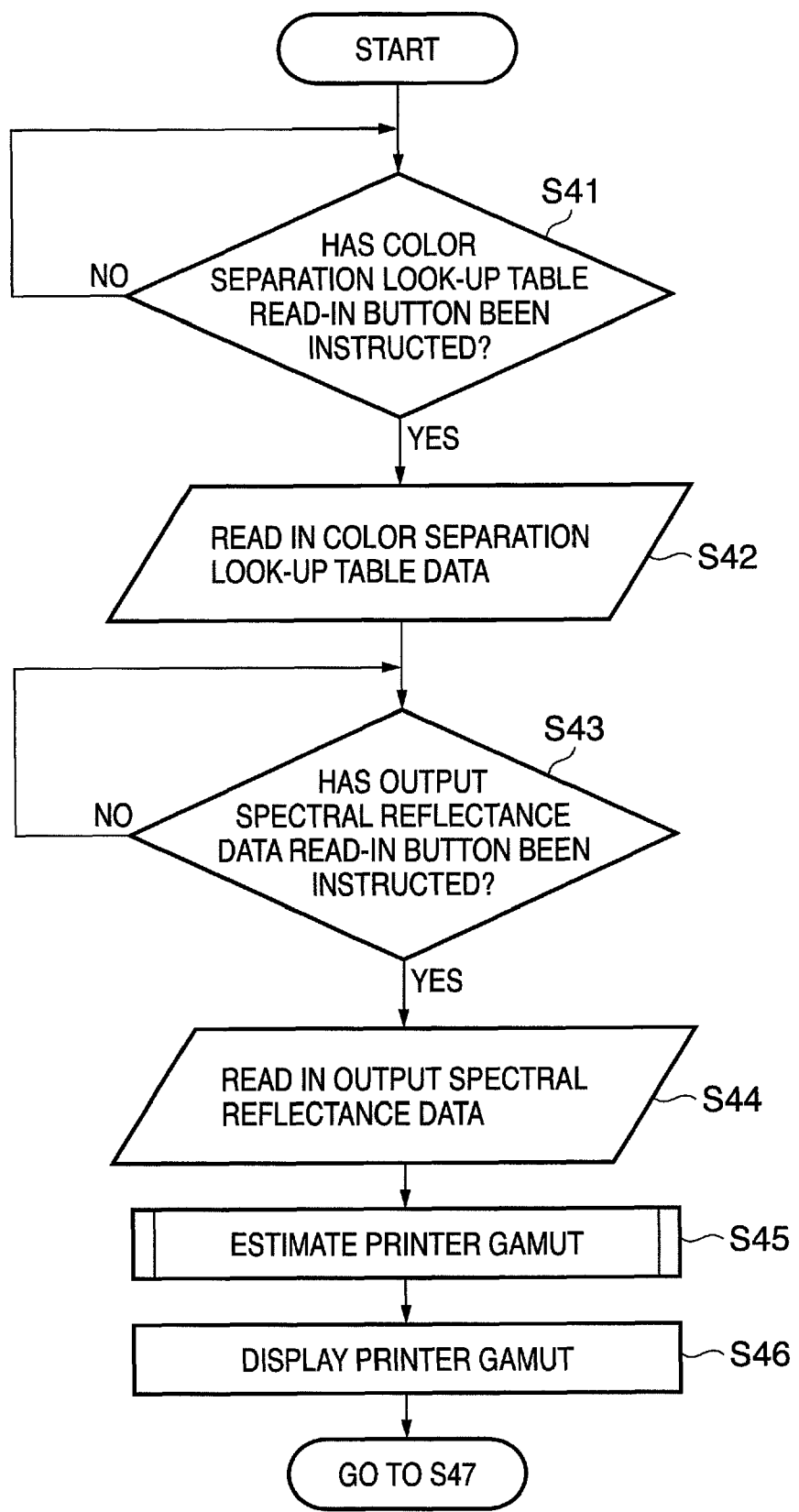
FIGS. 14 through 17 are flowcharts illustrating a process flow of an image processing apparatus.

Following is a detailed description of the method of estimating the gamut of the image output device 18, i.e., the printer, per FIG. 14, step S45, with reference to the drawings.

Figure 18:
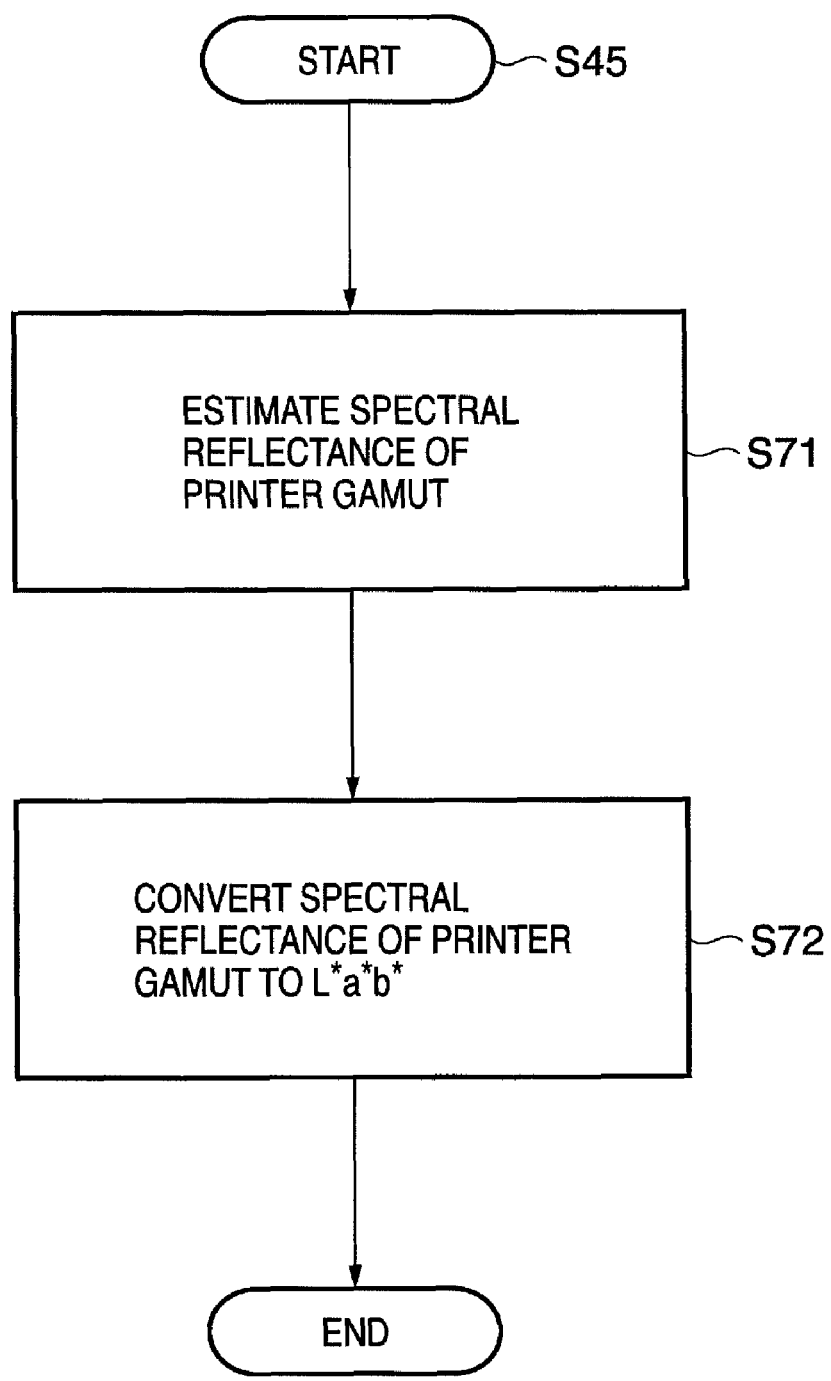
FIG. 18 is a flowchart illustrating a process that estimates a printer gamut.

FIG. 18 is a flowchart illustrating a process that estimates the printer gamut.

In step S71, the output spectral reflectance data that is stored in the output spectral reflectance data storage 1201 and the color separation look-up table that is stored in the color separation look-up table storage 9 are employed. First, the quantities of the coloring materials that are positioned at a boundary of the gamut are derived from the color separation look-up table. For example, if the input values of the color separation look-up table are RGB values, the output values, i.e., the quantities of the coloring materials that correspond to any of R, G, or B being zero are the quantities of coloring materials that are positioned at the boundary of the gamut. The spectral reflectance estimator 1202 is used to convert the quantities of coloring materials thus derived into the spectral reflectance data, in a manner to be described in detail hereinafter. In step S72, the data converter 13 is used to convert the spectral reflectance of the printer gamut into the L*a*b* values.

<Estimation of the Spectral Reflectance>

Following is a description of the spectral reflectance estimation, which is processed using the spectral reflectance estimator 1202.

The Celler Yule-Nielsen Modified Spectral Neugebauer, or other established technology, is employed as the predictive model of the printed material or other matter for the estimation of the spectral reflectance. However, the estimation is not limited thereto. Anything would be permissible that allows estimating the printed spectral reflectance from the combination of the quantities of the coloring materials.

<Calibration Process>

Figure 19:
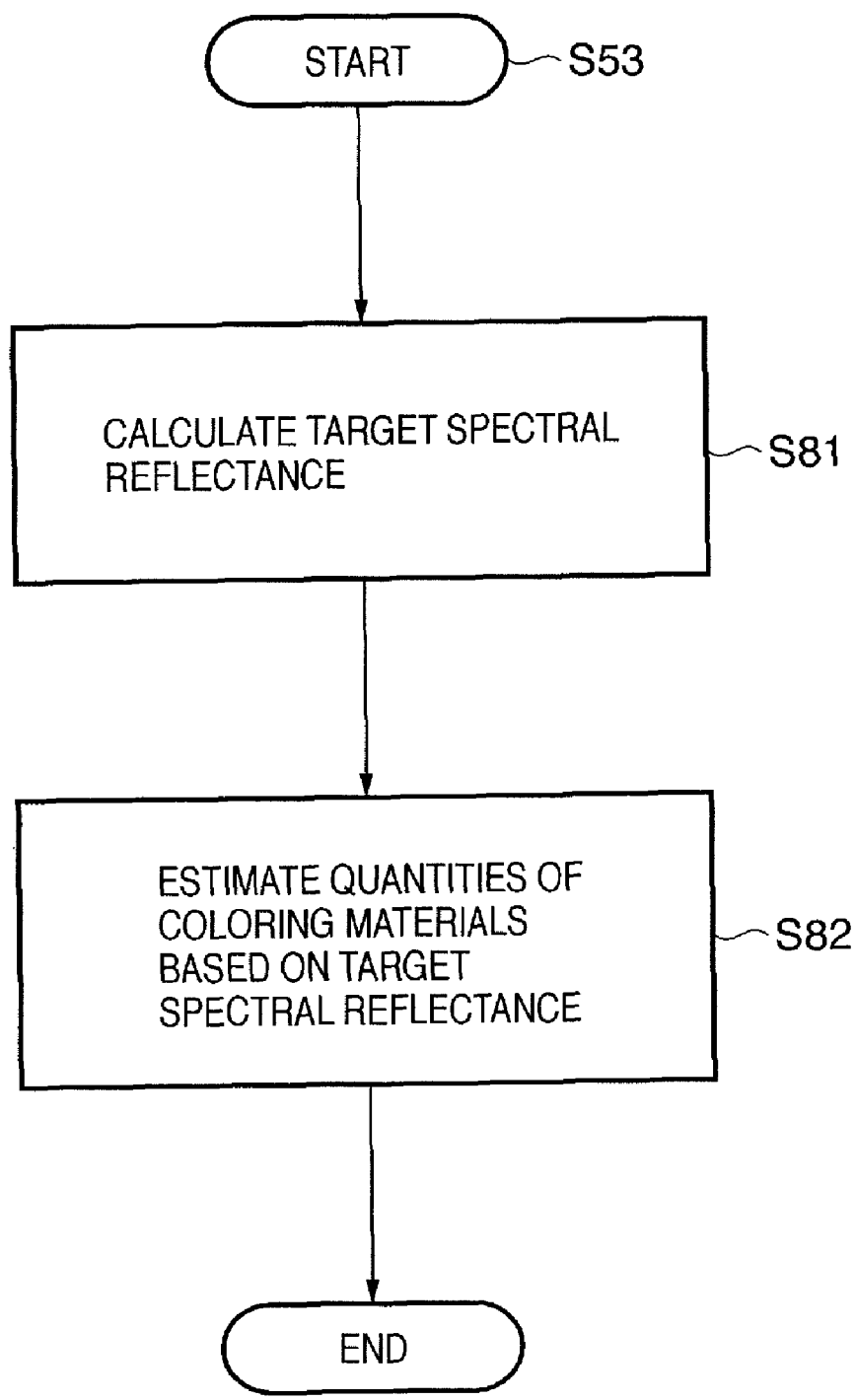
FIG. 19 is a flowchart illustrating in detail a calibration process in step S53.
Figure 20:
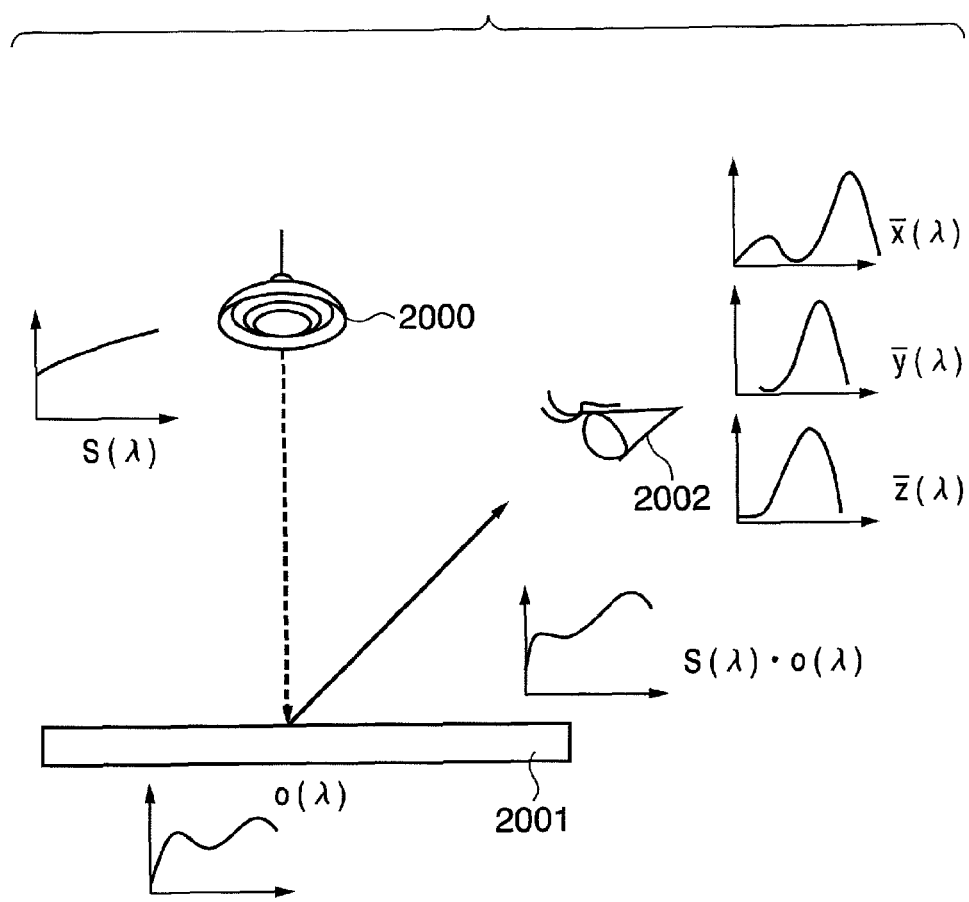
FIG. 20 illustrates calorimetric color reproduction.

FIG. 19 is a flowchart illustrating in detail a calibration process of step S53 (FIG. 16).

In step S81, the target spectral reflectance data is calculated similarly to the first embodiment. The process then proceeds to step S82, wherein the evaluation function selected in the calibration evaluation function selection section 306 is employed by the coloring material quantity estimator 1203 to estimate the combination of the quantities of the coloring materials.

Following is a description of the color estimate that is processed in the coloring material quantity estimator 1203.

The quantity of coloring material that fulfills the target spectral reflectance is estimated using the optimization process that employs the predictive model that is capable of performing the estimate of the spectral reflectance. The evaluation function that was selected in the calibration evaluation function selection section 306 is employed as the evaluation function that is employed in the optimization process.

The technique is not limited thereto, and any technique that optimizes the quantities of coloring materials for the inputted spectral reflectance would be permissible.

According to the second embodiment, it is possible to perform the contiguous spectral changing color separation process without printing the patch according to the first embodiment, by employing the outputted spectral reflectance data that is created by combining the quantities of coloring materials.

<Variant Example>

Whereas the calibration process is performed only on the gradation area that is specified by the user, according to the first and the second embodiments, it would also be permissible to automatically perform the calibration process on the entire printer gamut area.

Third Embodiment

The first and the second embodiments involve calibrating a portion that is affiliated with the color area that is instructed by a user, pertaining to the initial color separation look-up table. The third embodiment generates the color separation look-up table.

A hardware assembly of an image processing apparatus according to the third embodiment is identical to that depicted in FIG. 2, and thus, a description thereof is not repeated. The third embodiment may be fulfilled by a CPU executing a program for fulfilling the process illustrated in the flowcharts shown in FIG. 21 and FIG. 22.

The color separation look-up table according to the embodiment inputs the Device RGB values and outputs the coloring material value.

Figure 23:
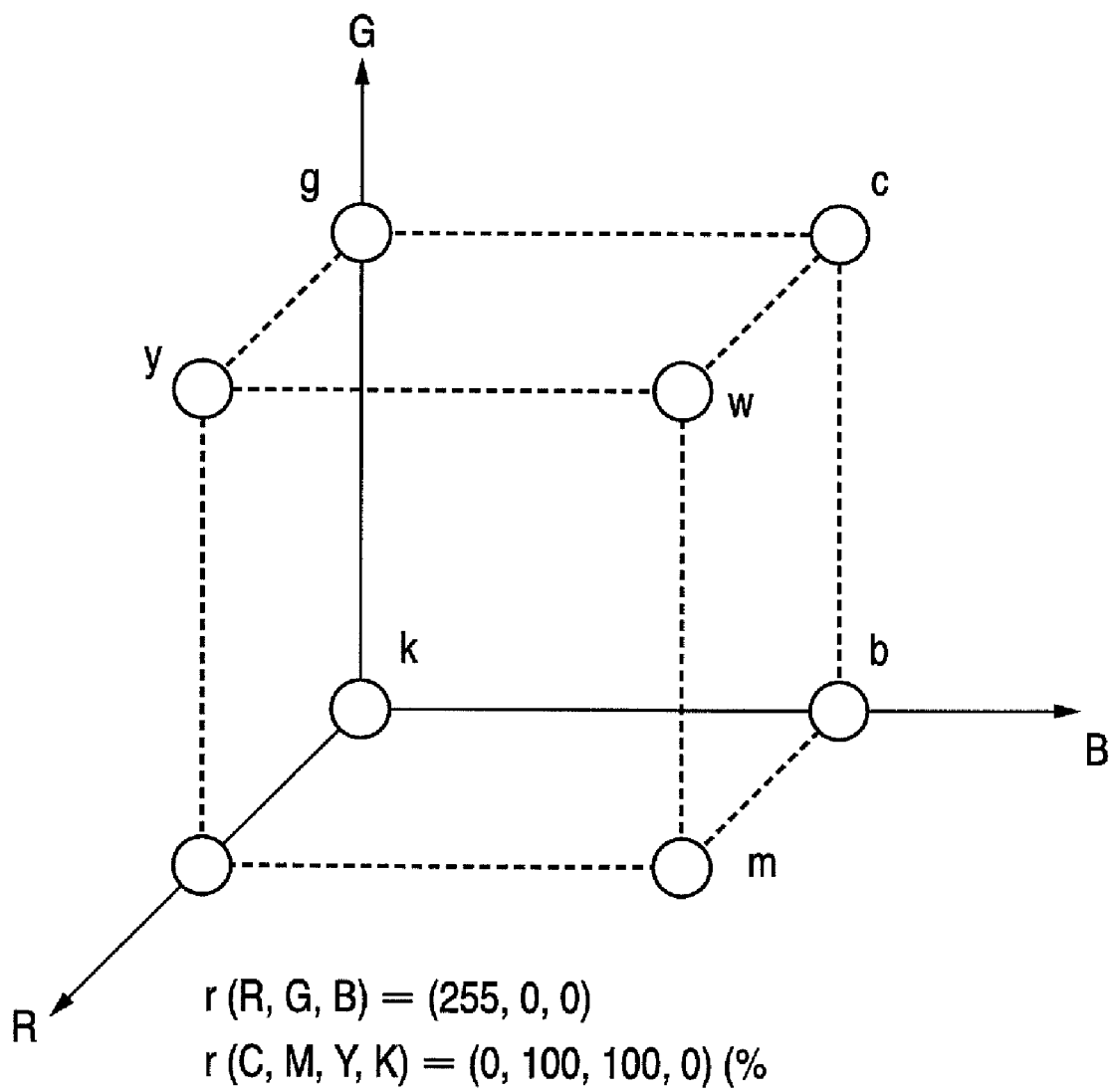
FIG. 23 is a conceptual view of a Device RGB space.

FIG. 23 depicts a conceptual view of a Device RGB space.

In FIG. 23, each of vertices of a color solid of an RGB color space r, g, b, c, m, y, k, and w is referred to as a primary. For example, if the Device RGB is an eight-bit data, then r(R,G,B)=(255,0,0). Each of the 12 lines that connect w, k, r, g, b, c, m, and y, as well as the w-k line, is referred to as a primary line.

Following is a description of an overview of a method of generating the color separation look-up table according to the third embodiment.

Pertaining to a key point of the color separation look-up table, a user first sets the coloring material value that is to control the color separation. The spectral reflectance data of the patch that is printed in accordance with the set coloring material value is obtained. Regarding the lattice points other than the key point, the target spectral reflectance data is calculated from the spectral reflectance data of the key point, and the coloring material value derived in accordance with the target spectral reflectance data is thus calculated. The primary is treated as the key point according to the embodiment. On the other hand, the primary may be treated as other colors such as flesh color, being important on color reproducing.

Figure 21:
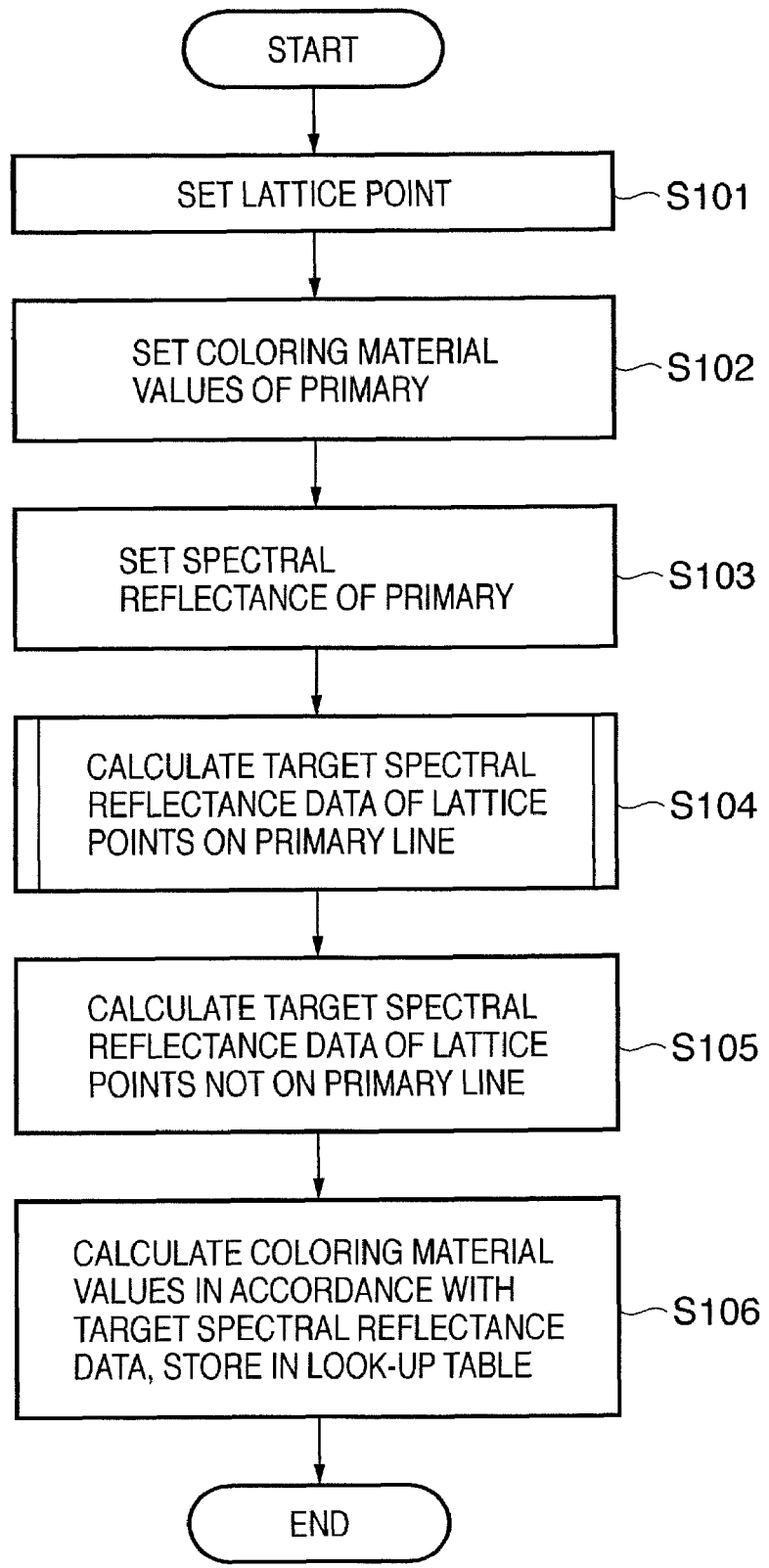
FIG. 21 is a flowchart illustrating a process flow that generates a color separation LUT of the image processing apparatus.

Following is a description of a process flow of generating the color separation look-up table, using the flowchart depicted in FIG. 21.

In step S101, lattice points are set in the Device RGB space. For example, partitioning the respective elements R, G, and B into a lattice of N steps yields N×N×N lattice points. In step S102, the coloring material value of each respective primary that is the key point is set. The process then proceeds to step S103, wherein the spectral reflectance data that corresponds to the coloring material value of each respective primary is obtained. It is permissible for a method of obtaining the spectral reflectance data to be a method of measuring the actually printed patch, or a method that employs the prediction model according to the second embodiment. In step S104, the target spectral reflectance data of the lattice points on the primary line is calculated based on the spectral reflectance data of the primary that is obtained in step S103, in a manner to be described hereinafter.

The process then proceeds to step S105, wherein the target spectral reflectance data of the lattice points other than the lattice points on the primary line is calculated based on the spectral reflectance data of the primary that is obtained in step S103 and the target spectral reflectance data of the lattice points on the primary line that is calculated in step S104. Either the technique that was employed in step S104 or another interpolation process is employed in step S105 to calculate the target spectral reflectance data of the lattice points other than the lattice points on the primary line. The process then proceeds to step S106, wherein the coloring material value of the lattice points other than the primary is calculated in accordance with the target spectral reflectance data of each respective lattice point that is calculated in step S104 and step S105, and stored in the look-up table. The coloring material value that corresponds to the target spectral reflectance data is calculated using a method similar to the foregoing, according to the embodiment.

<Method of Computing the Target Spectral Reflectance Data>

Following is a description of an exemplary method of calculating the target spectral reflectance data that is executed in step S104.

An equation (8), following, is employed to calculate the target spectral reflectance data of the lattice points on the primary line based on the target spectral reflectance data of two primaries that correspond to the endpoints of the primary line. The calculated target spectral reflectance data $R(\lambda)$ may be derived as per the equation (8) using the target spectral reflectance data of the two primaries $R_1(\lambda), R_2(\lambda)$:

$$R(\lambda)=\alpha R_1(\lambda)+(1-\alpha)R_2(\lambda) \quad (8)$$

$\alpha$ signifies an admixture ratio of $R_1(\lambda)$ and $R_1(\lambda)$.

As depicted in the equation (8), the target spectral reflectance $R(\lambda)$ is a vector sum of the target spectral reflectance of the primaries $R_1(\lambda), R_2(\lambda)$, and $R(\lambda)$ contiguously changes across all wavelengths as a changes contiguously.

According to the third embodiment, the contiguous change of the admixture ratio $\alpha$ may be achieved by controlling a brightness of a given emitted light to change contiguously.

It is possible to derive a brightness Y of a given lattice point as depicted in an equation (9), following, with a spectral reflectance brightness $l(\lambda)$ of a given emitted light:

$$Y = \int_{380}^{730} R(\lambda)l(\lambda)\bar{y}(\lambda)d\lambda \quad (9)$$
$$= \int_{380}^{730} [\alpha R_1(\lambda)l(\lambda)\bar{y}(\lambda) + (1-\alpha)R_2(\lambda)l(\lambda)\bar{y}(\lambda)]d\lambda$$

$\bar{y}(\lambda)$ signifies the isochromatic function $\bar{y}$, and K is the normalization coefficient.

$$Y_1 = K\int_{380}^{730} R_1(\lambda)l(\lambda)\bar{y}(\lambda)d\lambda, \quad (10)$$
$$Y_2 = K\int_{380}^{730} R_2(\lambda)l(\lambda)\bar{y}(\lambda)d\lambda$$

Thus, the equation (9) may be derived as per an equation (11), following:

$$Y=\alpha Y_1+(1-\alpha)Y_2 \quad (11)$$

Figure 24:
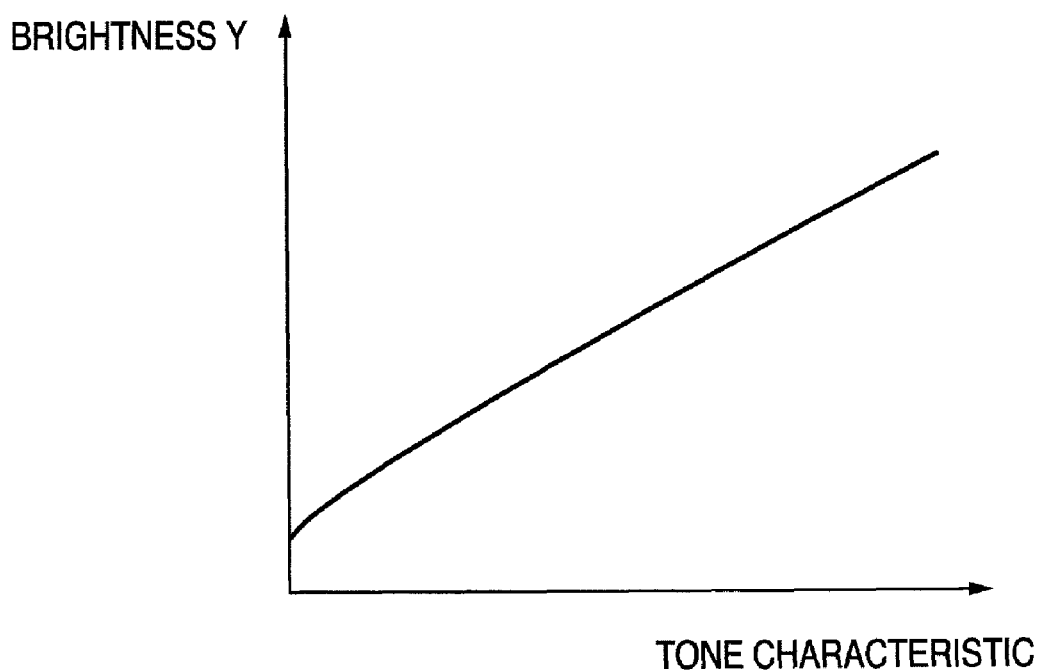
FIG. 24 is a graph illustrating a change in luminosity versus the tone characteristics.

As depicted in FIG. 24, the brightness is presumed to change contiguously between the two primaries. Given a positional relationship between a position of the lattice point of the primary and a lattice point of interest, the brightness y of the lattice point of interest is established from Y1 and Y2.

The admixture ratio α is calculated from Y, Y1, and Y2, using an equation (12):

$$\alpha = \frac{Y - Y_2}{Y_1 - Y_2} \quad (12)$$

Employing the equation (12) in place of the equation (8) allows calculating the target spectral reflectance R(λ) such that the brightness and the spectral reflectance both change contiguously over the primary line.

According to the embodiment, α is controlled in accordance with the brightness, which is a one-dimensional data, allowing ease of control over the spectral reflectance data, which is a multi-dimensional data, having 36 dimensions, for example. It is also possible to achieve a tone characteristic of high quality as the brightness that is used has the greatest sensitivity within the range of the human sense of vision.

Figure 22:
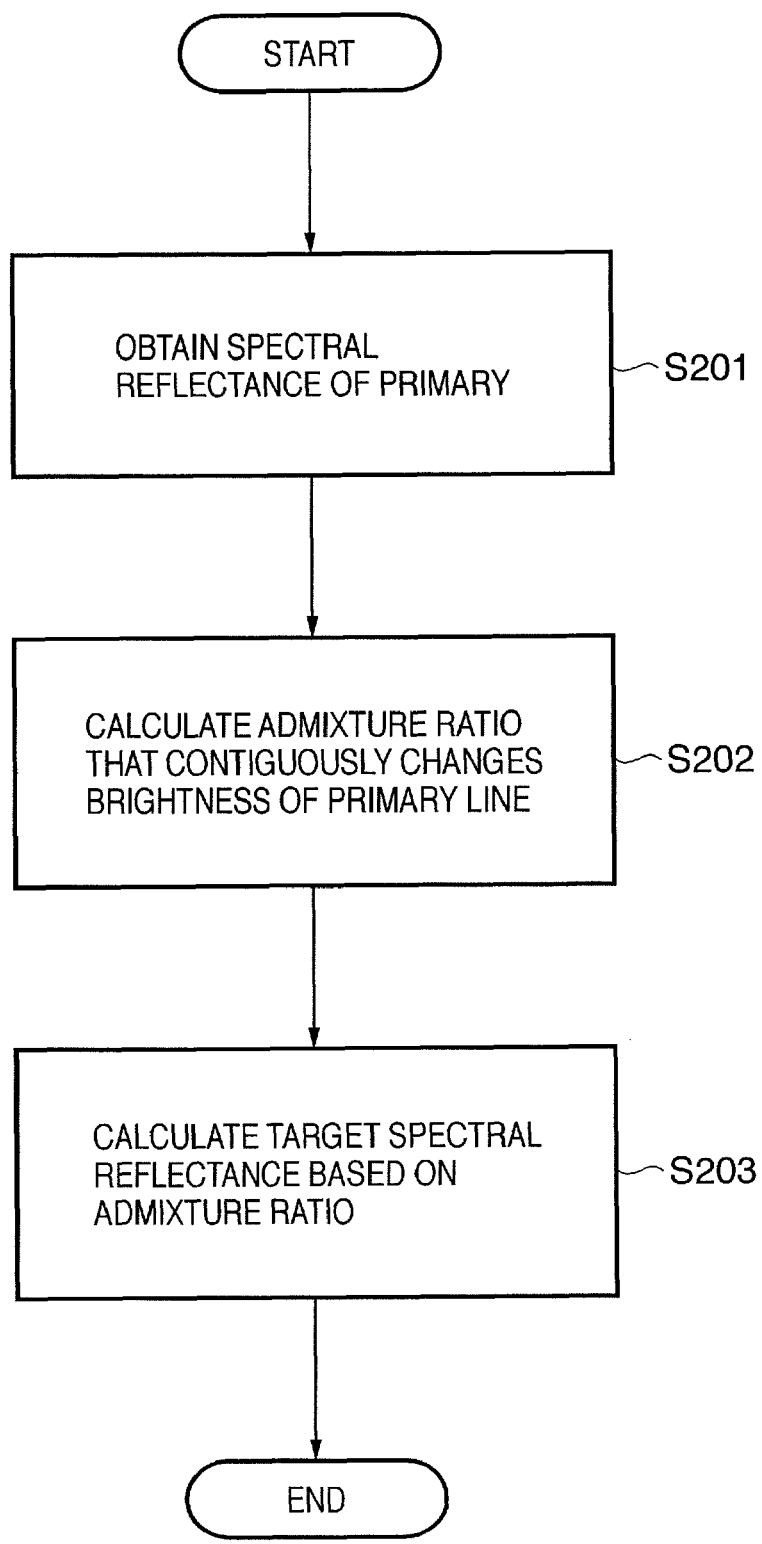
FIG. 22 is a flowchart illustrating a process flow that calculates a target spectral reflectance of lattice points on a primary line.

FIG. 22 is a flowchart illustrating a process flow that calculates the target spectral reflectance of the lattice points on the primary line.

In step S201, the target spectral reflectance data $R_1(\lambda), R_2(\lambda)$ of the two end points of the primary line, that is the objective of the calculation, is obtained. The equation (12) is employed in step S202 to calculate the admixture ratio α of the spectral reflectance that contiguously changes the brightness of the primary line. The equation (8) is employed in step S203 to calculate the target spectral reflectance based on the admixture ratio α. Performing the process in step S202 and step S203 on each respective lattice point other than the primaries on the primary line allows calculating the target spectral reflectance data of each respective lattice point other than the primaries on the primary line.

Performing the process from step S201 through step S203 on each respective primary line allows computing the target spectral reflectance data of each respective lattice point on each respective primary line.

Figure 25A:
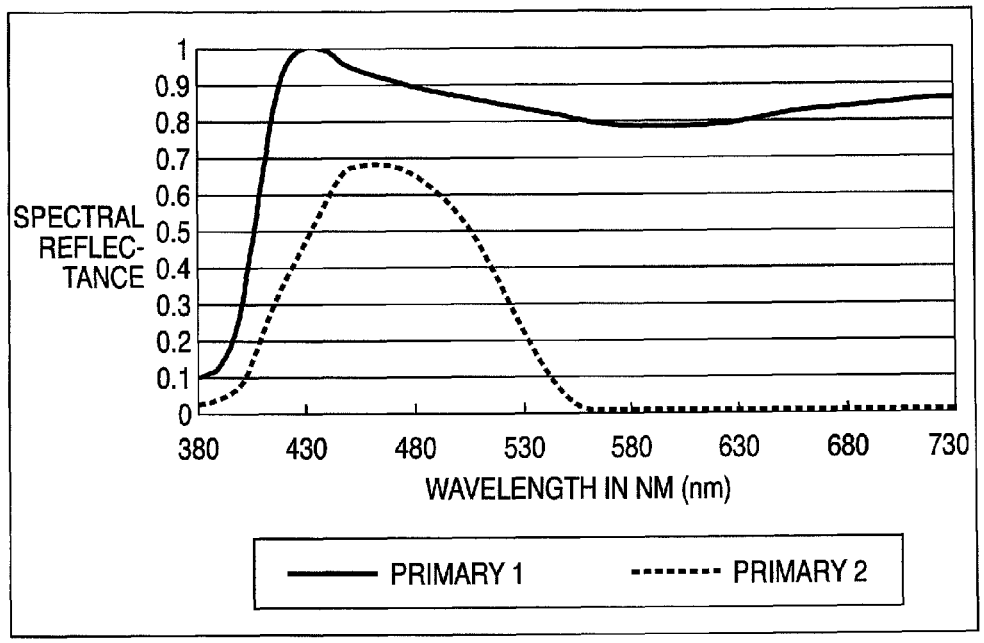
FIGS. 25A and 25B are graphs illustrating a target spectral reflectance on a primary line.
Figure 25B:
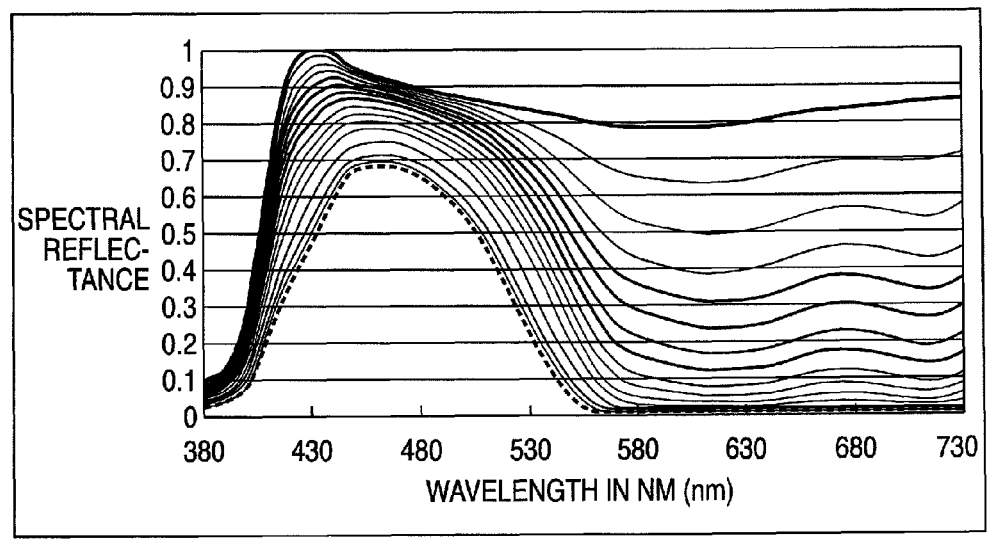

As an example calculation according to the embodiment, a gradation of the target spectral reflectance data for the w-c primary line is depicted in FIG. 25B, based on the primary 1 (w) and the primary 2 (c), such as is depicted in FIG. 25A. As shown in FIG. 25B, it is possible to change the target spectral reflectance data from w to c contiguously and without a reversal.

It is thus possible to inhibit a decline in the tone characteristic over the w-c interval, regardless of an individual difference between the type of the light emission source or the color matching function.

According to the embodiment, it is possible to generate the color separation look-up table that can maintain the high quality tone characteristic regardless of an individual difference between the type of the light emission source or the color matching function.

Whereas the admixture ratio α is controlled in accordance with the brightness according to the embodiment, it would be permissible to control the admixture ratio α in accordance with another element, such as the graininess or a supply of the printing material.

The change in the brightness when calculating the admixture ratio is not limited to a linear change such as that depicted in FIG. 24. It would be permissible to use the change in the gamma curve instead, for example. In general, a monotonically increasing change is preferred. When achieving a change that differs from that shown in FIG. 24, an equation that corresponds to a property of the change will be substituted for the equation (12).

Other Embodiments

While embodiments of the present invention have been described, the present invention may be applied to a document search system having a plurality of devices, as well as a document search apparatus that is a single device.

The present invention may be achieved by supplying, either directly or remotely, a software program that fulfills the feature set of the embodiment to the system or the apparatus, and having a computer in the system or the apparatus load and execute the program so supplied. In such a circumstance, the form need not be that of a program if the feature set of the program is present.

Accordingly, the program code that is loaded into the computer in order to fulfill the feature set process of the present invention will itself fulfill the present invention. In such a circumstance, the form of the program is irrelevant, provided that it has the feature set of the program, e.g., it may be object code, a program executed by an interpreter, or a script data that is supplied to an operating system.

A variety of recording media may be used to supply the program. Examples include a floppy disk, a hard drive, an optical disc, a magneto-optical (MO) disk, a CD-ROM, a CD-R, a CD-RW, a magnetic tape, a nonvolatile memory card, a ROM, or a DVD, such as a DVD-ROM or a DVD-R, among other possibilities.

As another method of supplying the program, a browser on a client computer may be employed to connect to a website on the Internet, and the program may be supplied by downloading from the website to a hard drive or other storage medium. In such a circumstance, it would be permissible for the file that is downloaded to contain either the computer program of the present invention itself, or be compressed and contain an automatic install feature. Fulfillment is also possible by segmenting the program code that constitutes the program of the present invention into a plurality of files, and downloading each respective file from a different webpage. A web server that downloads the program file for fulfilling, on the computer, the feature set process of the present invention to a plurality of users is also included within the scope of the claims of the present invention.

It would also be permissible to encrypt the program of the present invention, store the encrypted program on a CD-RON or other storage medium, and distribute the program to the user. In such a circumstance, key information that decrypts the encryption will be downloaded from a website on the Internet to a user who satisfies a prescribed condition, and the encrypted program will be installed on the computer in an executable form by use of the key information.

Fulfillment is also possible in a manner other than that wherein the feature set of the embodiment is fulfilled by having the computer execute the loaded program. For example, it is conceivable that the feature set according to the embodiment may be fulfilled by the process that is performed, in whole or in part, by the operating system or other software running on the computer, in accordance with the instruction of the program.

It would also be permissible for the program that is loaded from the storage medium to be written to a memory that is installed on an expansion board that is installed into the computer, or that is installed into an expansion unit that is connected to the computer. In such a circumstance, the feature set according to the embodiment is fulfilled by the process that is performed, in whole or in part, by the CPU or other hardware that is installed on the expansion board or into the expansion unit, in accordance with the instruction of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-134449, filed May 12, 2006, and Japanese Patent Application No. 2007-111903, filed Apr. 20, 2007, which are hereby incorporated by reference herein in their entirety.

What is claimed is:

1. A color processing apparatus for acquiring coloring material data used in an image output device, in correspondence with input color data, in order to cause the image output device to reproduce the input color data, the color processing apparatus comprising:
   an acquisition unit configured to acquire a plurality of spectral reflectance corresponding to a plurality of items of coloring material data representing a plurality of colors in a gradation area of the input color data;
   a calculation unit configured to calculate a target spectral reflectance corresponding to a target color in the gradation area of the input color data, based on the plurality of spectral reflectance acquired by the acquisition unit, in such a manner that the target spectral reflectance changes corresponding to the change of the plurality of colors in the gradation area; and
   a determination unit configured to determine the coloring material data that corresponds to the target spectral reflectance calculated by the calculation unit.

2. The color processing apparatus according to claim 1, further comprising:
   a storage unit configured to store a color separation look-up table; and
   a setting unit configured to set a gradation area in which the coloring material data is to be corrected, in response to an instruction of a user;
   wherein the coloring material data within the gradation area is corrected as pertains to the color separation look-up table.

3. The color processing apparatus according to claim 1, wherein the determination unit is configured to determine the coloring material data that corresponds to the target spectral reflectance, in accordance with an evaluated result of an employed evaluation function.

4. The color processing apparatus according to claim 1, wherein the calculation unit is configured to calculate a brightness value of the input color data, in accordance with a plurality of brightness that are calculated based on the plurality of spectral reflectance, and to determine an admixture condition based on the plurality of brightness and the brightness of the input color data, and to employ the admixture condition to calculate the target spectral reflectance, based on the plurality of spectral reflectance.

5. The color processing apparatus according to claim 2, further comprising:
   a generation unit configured to generate the color separation look-up table, by storing the coloring material data, that is determined by the determination unit, in a look-up table;
   wherein the input color data corresponds to a lattice point of the color separation look-up table.

6. The color processing apparatus according to claim 1, wherein the plurality of spectral reflectance data contains spectral reflectance data that corresponds to a plurality of primaries.

7. A computer-readable storage medium for storing a computer program for causing a computer to execute as a color processing apparatus for acquiring the coloring material data used in an image output device, in correspondence with input color data, in order to cause the image output device to reproduce the input color data, the program comprising:
   an acquisition step of acquiring a plurality of spectral reflectance corresponding to a plurality of items of coloring material data representing a plurality of colors in a gradation area of the input color data;
   a calculation step of calculating a target spectral reflectance corresponding to a target color in the gradation area of the input color data, based on the plurality of spectral reflectance acquired in the acquisition step, in such a manner that the target spectral reflectance changes corresponding to the change of the plurality of colors in the gradation area; and
   a determination step of determining the coloring material data that corresponds to the target spectral reflectance that is calculated in the calculation step.

8. The computer-readable storage medium according to claim 7, the program further comprising:
   a storage step of storing a color separation look-up table; and
   a setting step of setting a gradation area in which the coloring material data is to be corrected, in response to an instruction of a user;
   wherein the coloring material data within the gradation area is corrected as pertains to the color separation look-up table.

9. The computer-readable storage medium according to claim 7, wherein in the determination step, the coloring material data corresponding to the target spectral reflectance is determined, in accordance with an evaluated result of an employed evaluation function.

10. The computer-readable storage medium according to claim 7, wherein in the calculation step, a brightness value of the input color data is calculated, in accordance with a plurality of brightness that are calculated based on the plurality of spectral reflectance, and an admixture condition is determined based on the plurality of brightness and the brightness of the color data, and the admixture condition is employed to calculate the target spectral reflectance, based on the plurality of spectral reflectance.

11. The computer-readable storage medium according to claim 8, the program further comprising:
   a generation step of generating the color separation look-up table, by storing the coloring material data, that is determined in the determination step, in a table;
   wherein the input color data corresponds to a lattice point of the color separation look-up table.

12. The computer-readable storage medium according to claim 7, wherein the plurality of spectral reflectance data contains spectral reflectance data that corresponds to a plurality of primaries.

13. A color processing method of acquiring coloring material data used in an image output device, in correspondence with input color data, in order to cause the image output device to reproduce the input color data, the color processing method comprising:
   acquiring a plurality of spectral reflectance corresponding to a plurality of items of coloring material data representing a plurality of colors in a gradation area of the input color data;
   calculating a target spectral reflectance corresponding to a target color in the gradation area of the input color data, based on the plurality of spectral reflectance acquired in the acquiring step, in such a manner that the target spectral reflectance changes corresponding to the change of the plurality of colors in the gradation area; and determining the coloring material data that corresponds to the target spectral reflectance that is calculated in the calculating step.

14. The color processing method according to claim 13, further comprising:

storing a color separation look-up table; and setting a gradation area in which the coloring material data is to be corrected, in response to an instruction of a user;

wherein the coloring material data within the gradation area is corrected as pertains to the color separation look-up table.

15. The color processing method according to claim 13, wherein the coloring material data corresponding to the target spectral reflectance is determined, in accordance with an evaluated result of an employed evaluation function.

16. The color processing method according to claim 13, wherein a brightness value of the input color data of interest is calculated, in accordance with a plurality of brightness that are calculated based on the plurality of spectral reflectance, and an admixture condition is determined based on the plurality of brightness and the brightness of the input color data of interest, and the admixture condition is employed to calculate the target spectral reflectance, based on the plurality of spectral reflectance.

17. The color processing method according to claim 14 further comprising:

generating the color separation look-up table, by storing the coloring material data, that is determined in the determining step, in a table;

wherein the input color data of interest corresponds to a lattice point of the color separation look-up table.

18. The color processing method according to claim 13, wherein the plurality of spectral reflectance data contains spectral reflectance data that corresponds to a plurality of primaries.

* * * * *